(12) United States Patent
Lin

(10) Patent No.: US 9,417,348 B2
(45) Date of Patent: *Aug. 16, 2016

(54) UPDATING MICROSEISMIC HISTOGRAM DATA

(71) Applicant: Halliburton Energy Services, Inc., Houston, TX (US)

(72) Inventor: Avi Lin, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 602 days.

This patent is subject to a terminal disclaimer.

(21) Appl. No.: 13/792,772

(22) Filed: Mar. 11, 2013

(65) Prior Publication Data

US 2014/0098634 A1    Apr. 10, 2014

Related U.S. Application Data

(60) Provisional application No. 61/710,582, filed on Oct. 5, 2012.

(51) Int. Cl.
*G01V 1/28* (2006.01)
*G01V 1/40* (2006.01)
(Continued)

(52) U.S. Cl.
CPC .............. *G01V 1/288* (2013.01); *G01V 1/301* (2013.01); *G01V 1/34* (2013.01); *G01V 1/345* (2013.01); *G01V 1/40* (2013.01); *G01V 2210/1234* (2013.01); *G01V 2210/646* (2013.01)

(58) Field of Classification Search
CPC ....... E21B 47/06; E21B 43/26; E21B 33/124; G01V 1/288; G01V 1/308; G01V 1/40; G01V 1/345; G01V 1/301; G01V 1/34; G01V 2210/1234; G01V 2210/646
USPC ..................................................... 367/38, 73
See application file for complete search history.

(56) References Cited

U.S. PATENT DOCUMENTS 5,497,722 A    3/1996 English, Sr.
7,103,219 B2   9/2006 Cahill
(Continued)

FOREIGN PATENT DOCUMENTS

WO    WO 2008/107859    9/2008
WO    WO 2011/077223    6/2011
(Continued)

OTHER PUBLICATIONS

Chan et al.,"Updating Formulae and a Pairwise Algorithm for Computing Sample Variances," Technical Report STAN-CS-79-773, Department of Computer Science, Stanford University, Nov. 1979, 22 pages.
(Continued)

*Primary Examiner* — Daniel L Murphy
(74) *Attorney, Agent, or Firm* — Craig W. Roddy; Fish & Richardson P.C.

(57) ABSTRACT

Systems, methods and software can be used for analyzing microseismic data collected from a fracturing treatment of a subterranean zone. In some aspects, a plurality of basic planes are each defined from a subset of the microseismic data and each have an orientation relative to a common axis. Clusters of orientations of the basic planes previously identified adaptively based on the extent of variation in the orientations can be updated with new data. The number of orientations associated with each of the clusters is then identified.

20 Claims, 8 Drawing Sheets

(51) Int. Cl.
  *G01V 1/34* (2006.01)
  *G01V 1/30* (2006.01)

(56) References Cited

U.S. PATENT DOCUMENTS

| | | | |
|---|---|---|---|
| 7,783,127 B1 | 8/2010 | Wilensky | |
| 8,386,226 B2 | 2/2013 | Craig | |
| 8,392,165 B2 | 3/2013 | Craig et al. | |
| 9,176,246 B2 * | 11/2015 | Ma | G01V 1/288 |
| 2007/0272407 A1 | 11/2007 | Lehman et al. | |
| 2008/0004847 A1 | 1/2008 | Bradford | |
| 2010/0307755 A1 | 12/2010 | Xu et al. | |
| 2010/0312529 A1 | 12/2010 | Souche et al. | |
| 2011/0029291 A1 | 2/2011 | Weng et al. | |
| 2011/0029293 A1 | 2/2011 | Petty et al. | |
| 2011/0120702 A1 | 5/2011 | Craig | |
| 2011/0120705 A1 | 5/2011 | Walters et al. | |
| 2011/0120706 A1 | 5/2011 | Craig | |
| 2011/0120718 A1 | 5/2011 | Craig | |
| 2011/0125476 A1 | 5/2011 | Craig | |
| 2013/0044567 A1 | 2/2013 | Kratz | |
| 2013/0100769 A1 | 4/2013 | Riley et al. | |
| 2013/0154846 A1 | 6/2013 | Mangione et al. | |
| 2013/0304437 A1 | 11/2013 | Ma et al. | |
| 2014/0098634 A1 | 4/2014 | Lin | |

FOREIGN PATENT DOCUMENTS

| | | |
|---|---|---|
| WO | WO 2011/077227 | 6/2011 |
| WO | WO 2012/078128 | 6/2012 |
| WO | WO 2012/141720 | 10/2012 |

OTHER PUBLICATIONS

West, "Updating Mean and Variance Estimates: An Improved Method," Communications of the ACM, vol. 22, No. 9, University of Dublin, Sep. 1979, 4 pages.
Welford,"Note on a method for calculating corrected sums of squares and products," Technometrics 4(3), Aug. 1962, 3 pages.
Donald E. Knuth (1998). The Art of Computer Programming, volume 2: Seminumerical Algorithms, 3rd edn., p. 232. Boston: Addison-Wesley.
Pavone, "Histograms," downloaded Nov. 16, 2014 from http://www.pas.rochester.edu/~pavone/particle-www/teachers/analysis/HISTO-GRAMS.htm., 2 pages.
"Multimodel Distribution," 2014, downloaded Nov. 16, 2014 from http://en.wikipedia.org/wiki/Multimodel_distribution, 16 pages.
"Normal (geometry)," 2012, downloaded Nov. 16, 2014 from http://en.wikipedia.org/w/index.php?title=Normal_(geometry) &oldid=511349513, 6 pages.
"Two Dimensional Histograms," GNU, 2010, downloaded Nov. 16, 2014 from https://web.archive.org/web/20101225060613/http:/www.gnu.org/software/gsl/manual/html_node/Two-dimensional-histograms.html., 1 page.
Lin, "Identifying Orientation Clusters From Microseismic Data," Utility U.S. Appl. No. 13/861,986, filed Apr. 12, 2013, 65 pages.
Ma et al., "Identifying Dominant Fracture Orientations", Utility U.S. Appl. No. 13/896,792, filed May 17, 2013, 50 pages.
Mayerhofer et al., "Integrating Fracture Diagnostic Engineering Data in the Marcellus Shale," SPE 145463, 2011, SPE Annual Technical Conference and Exhibition, Oct. 30-Nov. 2, 2011, Denver, Colorado, 15 pages.
Williams et al., "Quantitative Interpretation of Major Planes from Microseismic Events Locations With Application in Production Prediction", SEG 2010-2085, 2010 SEG Annual Meeting, October, Denver, Colorado, 5 pages.
Authorized Officer Luis-Miguel Paredes Sanchez, International Search Report and Written Opinion of the International Searching Authority, PCT/US2013/059149, Jan. 21, 2014, 11 pages.
Authorized Officer Athina Nickitas-Etienne, PCT/International Preliminary Report on Patentability, PCT/US2013/059149, Apr. 16, 2015, 8 pages.
Australian Government IP Australia, Patent Examination Report No. 1, Australian Application No. 2013325147, Apr. 7, 2016, 3 pages.

* cited by examiner

UPDATING MICROSEISMIC HISTOGRAM DATA

BACKGROUND

This specification relates to identifying dominant fracture orientations from microseismic data. Microseismic data are often acquired in association with hydraulic fracturing treatments applied to a subterranean formation. The hydraulic fracturing treatments are typically applied to induce artificial fractures in the subterranean formation, and to thereby enhance hydrocarbon productivity of the subterranean formation. The pressures generated by the fracture treatment can induce low-amplitude or low-energy seismic events in the subterranean formation, and the events can be detected by sensors and collected for analysis.

SUMMARY

In a general aspect, dominant fracture orientations in a subterranean zone are identified from microseismic data.

In some aspects, a basic plane orientation is determined for each of a plurality of basic planes. The basic planes are defined by coplanar subsets of microseismic event data (e.g., three or more microseismic events) collected from a fracture treatment of a subterranean zone. The quantity of the basic plane orientations in each of a plurality of clusters is calculated. A dominant fracture orientation is identified for the subterranean zone based on one or more of the identified quantities.

Implementations may include one or more of the following features. A histogram is displayed, and the histogram indicates the quantity of basic plane orientations in each of the clusters. The identified quantity of the basic plane orientations can be a probability value, a frequency value, a number value, or another type of value.

Additionally or alternatively, these and other implementations may include one or more of the following features. Each basic plane orientation includes a strike angle and a dip angle for one of the basic planes. The plurality of clusters are identified based on the basic plane orientations. The plurality of clusters are identified by sorting the strike angles, identifying clusters of the sorted strike angles, sorting the dip angles, identifying clusters of the sorted dip angles, and defining the clusters based on the clusters of sorted strike angles and the clusters of sorted dip angles.

Additionally or alternatively, these and other implementations may include one or more of the following features. The plurality of clusters are fixed values determined independent of the basic plane orientations. Each coplanar subset of microseismic events is identified from the microseismic event data. A normal vector for the basic plane defined by each coplanar subset is computed. The basic plane orientations are computed based on the normal vectors.

Additionally or alternatively, these and other implementations may include one or more of the following features. Identifying a dominant fracture orientation includes identifying a plurality of dominant fracture orientations. Identifying the plurality of dominant fracture orientations includes identifying the clusters having the highest quantities of fracture planes. A cluster of microseismic events associated with each of the dominant fracture orientations is identified. A dominant fracture plane for each dominant fracture orientation is generated based on fitting (e.g., optimally or otherwise) the microseismic events in the cluster.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1A:
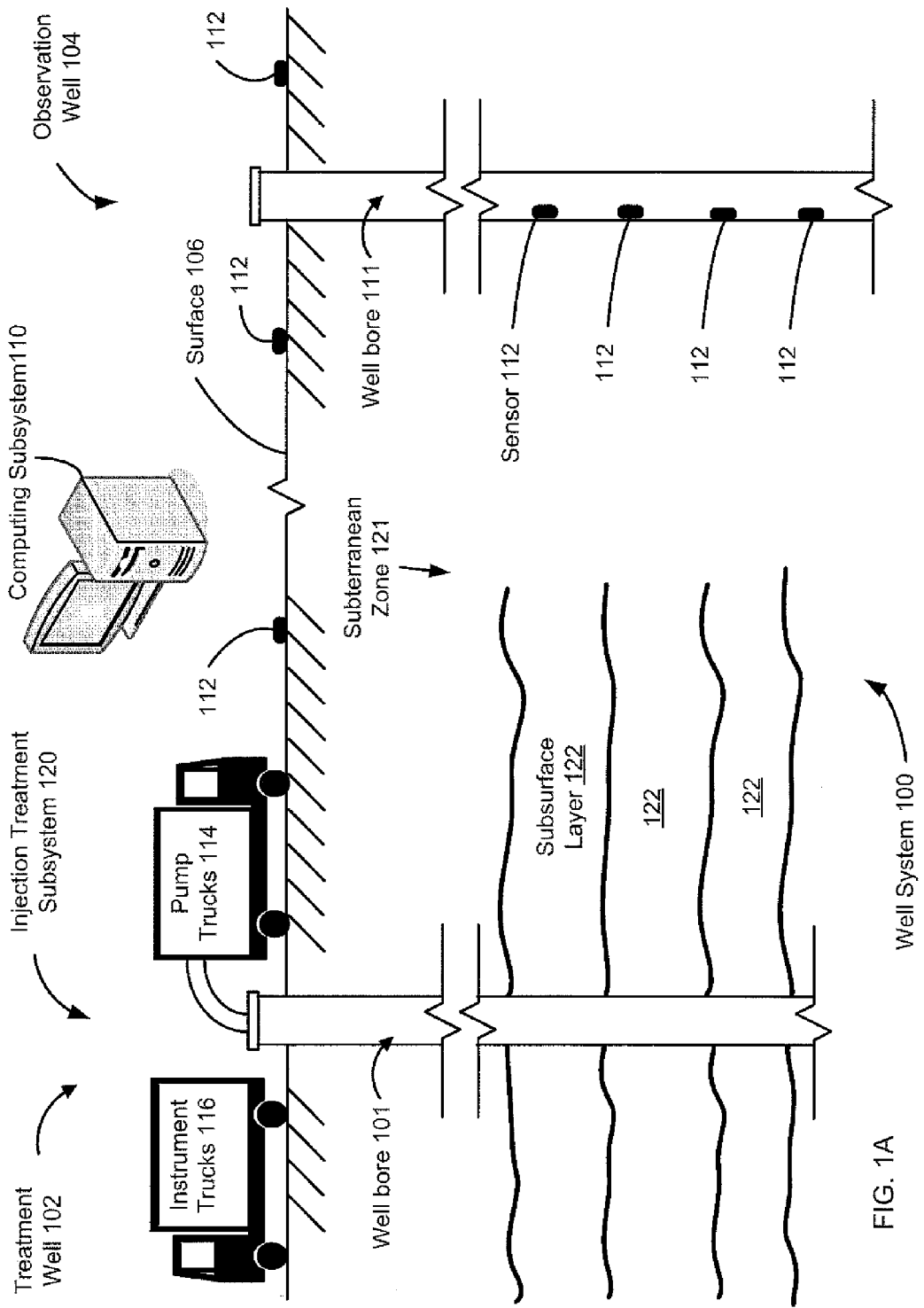
FIG. 1A is a diagram of an example well system.

In some aspects of what is described here, fracture parameters, dominant fracture orientations, or other data are identified from microseismic data. In some cases, these or other types of data are dynamically identified, for example, in a real-time fashion during a fracture treatment. For many applications and analysis techniques, an identification of fracture planes from real-time microseismic events is needed, and individual fracture planes can be displayed to show time evolution and geometric elimination, including location, propagation, growth, reduction, or elimination of the fracture planes. Such capabilities can be incorporated into control systems, software, hardware, or other types of tools available to oil and gas field engineers when they analyze potential oil and gas fields, while stimulating hydraulic fractures and analyzing the resultant signals. Such tools can provide a reliable and direct interface for presenting and visualizing the dynamics of hydraulic fractures, which may assist in analyzing the fracture complexity, fracture network structure, and reservoir geometry. Such tools can assist in evaluating the effectiveness of hydraulic fracturing treatment, for example, by improving, enhancing, or optimizing the fracture density and trace lengths and heights. Such improvements in the fracture treatment applied to the reservoir may enhance production of hydrocarbons or other resources from the reservoir.

Hydraulic fracture treatments can be applied in any suitable subterranean zone. Hydraulic fracture treatments are often applied in tight formations with low-permeability reservoirs, which may include, for example, low-permeability conventional oil and gas reservoirs, continuous basin-centered resource plays and shale gas reservoirs, or other types of formations. Hydraulic fracturing can induce artificial fractures in the subsurface, which can enhance the hydrocarbon productivity of a reservoir.

During the application of a hydraulic fracture treatment, the injection of high-pressure fluids can alter stresses, accumulate shear stresses, and cause other effects within the geological subsurface structures. In some cases, microseismic events are associated with hydraulic fractures induced by the fracturing activities. The acoustic energy or sounds associated with rock stresses, deformations, and fracturing can be detected and collected by sensors. In some cases, microseismic events have low-energy (e.g., with the value of the log of the intensity or moment magnitude of less than three), and some uncertainty or accuracy or measurement error is associated with the event locations. The uncertainty can be described, for example, by a prolate spheroid, where the highest likelihood is at the spheroid center and the lowest likelihood is at the edge.

Microseismic event mapping can be used to geometrically locate the source point of the microseismic events based on the detected compressional and shear waves. The detected compressional and shear waves (e.g., p-waves and s-waves) can yield additional information about microseismic events, including the location of the source point, the event's location and position measurement uncertainty, the event's occurrence time, the event's moment magnitude, the direction of particle motion and energy emission spectrum, and possibly others. The microseismic events can be monitored in real time, and in some cases, the events are also processed in real time during the fracture treatment. In some cases, after the fracture treatment, the microseismic events collected from the treatment are processed together as "post data."

Processing microseismic event data collected from a fracture treatment can include fracture matching (also called fracture mapping). Fracture matching processes can identify fracture planes in any zone based on microseismic events collected from the zone. Some example computational algorithms for fracture matching utilize microseismic event data (e.g., an event's location, an event's location measurement uncertainty, an event's moment magnitude, etc.) to identify individual fractures that match the collected set of microseismic events. Some example computational algorithms can compute statistical properties of fracture patterns. The statistical properties may include, for example, fracture orientation, fracture orientation trends, fracture size (e.g., length, height, area, etc.), fracture density, fracture complexity, fracture network properties, etc. Some computational algorithms account for uncertainty in the events' location by using multiple realizations of the microseismic event locations. For example, alternative statistical realizations associated with Monte Carlo techniques can be used for a defined probability distribution on a spheroid or another type of distribution.

Generally, fracture matching algorithms can operate on real-time data, post data, or any suitable combination of these and other types of data. Some computational algorithms for fracture matching operate only on post data. Algorithms operating on post data can be used when any subset or several subsets of microseismic data to be processed has been collected from the fracture treatment; such algorithms can access (e.g., as an initial input) the full subset of microseismic events to be processed. In some implementations, fracture matching algorithms can operate on real-time data. Such algorithms may be used for real-time automatic fracture matching during the fracture treatment. Algorithms operating on real-time data can be used during the fracture treatment, and such algorithms can adapt or dynamically update a previously-identified fracture model to reflect newly-acquired microseismic events. For example, once a microseismic event is detected and collected from the treatment field, a real-time automatic fracture matching algorithm may respond to this new event by dynamically identifying and extracting fracture planes from the already-collected microseismic events in a real-time fashion. Some computational algorithms for fracture matching can operate on a combination of post data and real-time data.

In some cases, fracture mapping algorithms are configured to handle conditions that arise in real-time microseismic data processing. For example, several types of challenges or conditions may occur more predominantly in the real-time context. In some cases, real-time processing techniques can be adapted to account for (or to reduce or avoid) the lower accuracy that is sometimes associated with fractures extracted from data sets lacking a sufficient number of microseismic events or lacking a sufficient number of microseismic events in certain parts of the domain. Some real-time processing techniques can be adapted to produce fracture data that are consistent with the fracture data obtainable from post data processing techniques. For example, some of the example real-time processing techniques described here have produced results that are statistically the same, according to the statistical hypothesis test (t test and F test), as results produced by post data processing techniques on the same data.

In some cases, real-time processing techniques can be adapted to readily (e.g., instantaneously, from a user's perspective) offer the identified fracture data to users. Such features may allow field engineers or operators to dynamically obtain fracture geometric information and adjust fracture treatment parameters when appropriate (e.g. to improve, enhance, optimize, or otherwise change the treatment). In some cases, fracture planes are dynamically extracted from microseismic data and displayed to field engineers in real time. Real-time processing techniques can exhibit high-speed performance. In some cases, the performance can be enhanced by parallel computing technology, distributed computing technology, parallel threading approaches, fast binary-search algorithms, or a combination of these and other hardware and software solutions that facilitate the real-time operations.

In some implementations, fracture matching technology can directly present information about fractures planes associated with three-dimensional microseismic events. The fracture planes presented can represent fracture networks that exhibit multiple orientations and activate complex fracture patterns. In some cases, hydraulic fracture parameters are extracted from a cloud of microseismic event data; such parameters may include, for example, fracture orientation trends, fracture density and fracture complexity. The fracture parameter information can be presented to field engineers or operators, for example, in a tabular, numerical, or graphical interface or an interface that combines tabular, numerical, and graphical elements. The graphical interface can be presented in real time and can exhibit the real-time dynamics of hydraulic fractures. In some cases, this can help field engineers analyze the fracture complexity, the fracture network and reservoir geometry, or it can help them better understand the hydraulic fracturing process as it progresses.

In some implementations, accuracy confidence values are used to quantify the certainty of the fracture planes extracted from microseismic data. The accuracy confidence values can be used to classify the fractures into confidence levels. For example, three confidence levels (low confidence level, medium confidence level and high confidence level) are appropriate for some contexts, while in other contexts a different number (e.g., two, four, five, etc.) of confidence levels may be appropriate. A fracture plane's accuracy confidence value can be calculated based on any appropriate data. In some implementations, a fracture plane's accuracy confidence value is calculated based on the microseismic events' locations and position uncertainties, individual microseismic events' moment magnitude, distances between individual events and their supporting fracture plane, the number of supporting events associated with the fracture plane, and the weight of variation of the fracture orientation, among others.

The accuracy confidence values can be computed and the fracture planes can be classified at any appropriate time. In some cases, the accuracy confidence values are computed and the fracture planes are classified in real time during the fracture treatment. The fracture planes can be presented to the user at any appropriate time and in any suitable format. In some cases, the fracture planes are presented graphically in a user interface in real time according to the accuracy confidence values, according to the accuracy confidence levels, or according to any other type of classification. In some cases, users can select individual groups or individual planes (e.g., those with high confidence levels) for viewing or analysis. The fracture planes can be presented to the user in an algebraic format, a numerical format, graphical format, or a combination of these and other formats.

In some implementations, microseismic events are monitored in real time during the hydraulic fracture treatment. As the events are monitored, they may also be processed in real time, they may be processed later as post data, or they may be processed using a combination of real time and post data processing. The events may be processed by any suitable technique. In some cases, the events are processed individually, at the time and in the order in which they are received. For example, a system state $S(M,N-1)$ can be used to represent the M number of planes generated from the N-1 previous events. The new incoming $N^{th}$ event can trigger the system $S(M,N-1)$. In some cases, upon receiving the $N^{th}$ event, a histogram or distribution of clusters is generated. For example, a probability distribution histogram or the Hough transform histogram of the degenerated planes in the strike and dip angle domain can be generated to identify the feasible dominant orientations imbedded in the fractures sets.

A basic plane can be generated from a subset of microseismic events. For example, any three non-collinear points in space mathematically define a basic plane. The basic plane defined by three non-collinear microseismic events can be represented by the normal vector (a, b, c). The normal vector (a, b, c) may be computed based on the three events' positions. The basic plane's orientation can be computed from the normal vector. For example, the dip $\theta$ and the strike $\varphi$ can be given by $$\theta = \arctan\frac{\sqrt{a^2 + b^2}}{c}, \varphi = \arctan\frac{b}{a}. \quad (1)$$

The dip angle $\theta$ of a fracture plane can represent the angle between the fracture plane and the horizontal plane (e.g., the xy-plane). The strike angle $\varphi$ of a fracture plane can represent the angle between a horizontal reference axis (e.g., the x-axis) and a horizontal line where the fracture plane intersects the horizontal plane. For example, the strike angle can be defined with respect to North or another horizontal reference direction. A fracture plane can be defined by other parameters, including angular parameters other than the strike angle and dip angle.

In general, N events can support P basic planes, where $F=N(N-1)(N-2)/\theta$, strike and dip angles. A probability histogram can be constructed from the orientation angles. The probability histogram or the enhanced Hough transformation histogram can have any suitable configuration. For example, the histogram configuration can be based on a fixed bin size and a fixed number of bins, natural optimal bin size in the strike and dip angle domain, or other types of bins. The histogram can be based on any suitable number of microseismic events (e.g., tens, hundreds, thousands, etc.), and any suitable range of orientations. In some cases, multiple discrete bins are defined for the histogram, and each bin represents a discrete range of orientations. A quantity of basic planes in each discrete range can be computed from the basic planes. In some cases, each basic plane's orientation falls within the orientation range associated with one of the bins. For example, for N microseismic events, each of the P basic planes can be assigned to a bin, and the quantity of basic planes assigned to each bin can be computed. The quantity computed for each bin can be any suitable value. For example, the quantity can be a non-normalized number of basic planes, the quantity can be a normalized probability, frequency, or fraction of basic planes, or the quantity can be another type of value that is suitable for a histogram. A histogram can be generated to represent the quantity of basic planes assigned to all of the bins, or to represent the quantity of basic planes assigned to a subset of the bins.

In some examples, the histogram is presented as a three-dimensional bar chart, a three-dimensional surface map, or another suitable plot in an appropriate coordinate system. The peaks on the histogram plot can indicate dominant fracture orientations. For example, along one axis the histogram may represent strike angles from 0° through 360° (or another range), and the strike angles can be divided into any suitable number of bins; along another axis the histogram may represent dip angles from 60° through 90° (or another range), and the dip angles can be divided into any suitable number of bins. The quantity (e.g., probability) for each bin can be represented along a third axis in the histogram. The resulting plot can exhibit local maxima (peaks). Each local maximum (peak) can indicate a respective strike angle and dip angle that represents a dominant fracture orientation. For example, the local maximum of the histogram may indicate that more basic planes are aligned along this direction (or range of directions) than along neighboring directions, and these basic planes are either closely parallel or substantially on the same plane.

The orientation range represented by each bin in the histogram can be determined by any appropriate technique. In some cases, each bin represents a pre-determined range of orientations. For example, the fixed bin size method can be used. In some cases, the range or size for each bin is computed based on the data to be represented by the histogram. For example, the natural optimal bin size method can be used. In some cases, the basic plane orientations are sorted, and clusters of sorted orientations are identified. For example, all strikes can be sorted in a decreasing or increasing order and then grouped into clusters; similarly, all dip values can be sorted in a decreasing or increasing order and then grouped into clusters. The clusters can be associated with two-dimensional grid, and the number of basic planes in each grid cell can be counted. In some cases, this technique can generate adaptive and dynamic clusters, leading to highly accurate values for the dominant orientations. This technique and associated refinements can be implemented with $N^8 \log(N)$ computational complexity. In some cases, the bin sizes for both the strike and dip are fixed, and each basic plane's location grid cell can be explicitly determined by the associated strike and dip with $N^8$ computational complexity.

Fracture planes associated with a set of microseismic events can be extracted from the dominant orientations embedded in the histogram data. Basic planes that support the dominant orientation $(\theta, \varphi)$ may be either nearly parallel or on the same plane. Basic planes located within the same plane can be merged together, forming a new fracture plane with stronger support (e.g., representing a larger number of microseismic events). Any suitable technique can be used to merge the fracture planes. In some cases, for each dominant orientation $(\theta, \varphi)$, a normal to the plane vector is constructed with components $(\sin \theta \cos \varphi, \sin \theta \sin \varphi, \cos \theta)$. In some cases, the results are insensitive to the location of the plane, and without loss of generality, the plane can be constructed from this normal vector (e.g., assuming the origin is in the plane). The plane can be described by $x \sin\theta \cos\phi + y \sin\theta \sin\phi + z\cos\theta = 0$. The normal signed distance of each event $(x_0, y_0, z_0)$ from a basic plane to the constructed plane can be represented $d = -(x_0 \sin\theta \cos\phi + y_0 \sin\theta \sin\phi + x_0 \cos\theta)$. In this representation, events with opposite signs of d are located opposite sides of the plane.

In some cases, microseismic events are grouped into clusters based on their distance from the constructed fracture planes. For example, a cluster of events can contain the group of events closest to a constructed fracture plane. As such, each cluster of microseismic events can support a particular fracture plane. The cluster size refers to the number of the events the cluster contains. In some cases, user input or other program data can designate a minimum number of events in a sustained cluster. The minimum cluster size can depend on the number of microseismic events in the data. In some cases, the minimum cluster size should be larger than or equal three. For example, clusters having a size larger than or equal to the minimum cluster size can be considered legitimate fracture planes. A fitting algorithm can be applied to the location and location uncertainty values for the events in each cluster to find their corresponding fracture plane.

Any suitable technique can be used to identify a fracture plane from a set of microseismic events. In some cases, a Chi-square fitting technique is used. Given K observed microseismic events, the locations can be represented $(x_t, y_t, z_t)$, and their measurement uncertainties can be represented $(\sigma_{t,x}, \sigma_{t,y}, \sigma_{t,z})$, where $1 \le t \le K$. The parameters of the plane model $z = zx + by + c$ can be calculated, for example, by minimizing the Chi-square merit function $$\chi^2(a, b, c) = \sum_{i=1}^{K} \frac{(z_t - ax_t - by_t - c)^2}{\sigma_{t,z}^2 + a^2 \sigma_{t,x}^2 + b^2 \sigma_{t,y}^2} \quad (2)$$

The Chi-square merit function can be solved by any suitable technique. In some cases, a solution can be obtained by solving three equations, which are the partial derivatives of $\chi^2(a, b, c)$ with respect to its variables, where each partial derivative is forced to zero. In some cases, there is no analytical solution for this nonlinear mathematical system of equations. Numerical methods (e.g., Newton's numerical method, the Newton Rafson method, the conjugate gradient method, or another technique) can be applied to solve for the parameters a, b and c, and the strike and dip angles can be computed (e.g., using equation (1) above). The orientation of the dominant fracture plane computed from the microseismic events can be the same as, or it can be slightly different from, the dominant fracture orientation identified from the histogram.

In some implementations, an algorithm iterates over all possible dominant orientations to expand all feasible fracture planes. In some cases, the algorithm iterates over a selected subset of possible dominant orientations. The iterations can converge to planes. Some planes may be exactly equal to each other and some may be close to each other. Two planes can be considered "close" to each other, for example, when the average distance of one plane's events from another plane is less than a given threshold. The threshold distance can be designated, for example, as a control parameter. The algorithm can merge close planes together and the support events of one plane can be associated with the support events of the other merged plane(s).

In some cases, constraints are imposed on the fracture planes identified from the microseismic data. For example, in some cases, the distance residual of events must be less than a given tolerance distance. The tolerance distance can be designated, for example, as a control parameter. In some cases, the identified fracture planes need to be properly truncated to represent the finite size of fractures. The boundary of truncated planes can be calculated from the support events' position and the events' location measurement uncertainty. The new finite-size fracture planes can be merged with the already-identified fractures.

In some cases, a new incoming $N^{th}$ microseismic event is associated with the fracture planes already identified based on the previous N−1 microseismic events. Upon associating the new event with an existing fracture, an algorithm can be used to update the existing fracture. For example, updating the fracture may change the fracture's geometry, location, orientation, or other parameters. Upon choosing one of the previously-identified fracture planes, the fracture plane's distance from the new event can be calculated. If the distance is less than or equal to the distance control parameter, the new event can be added to the supporting event set for the fracture plane. If the distance is larger than the distance control parameter, other previously-identified fracture planes can be selected (e.g., iteratively or recursively) until a plane within the threshold distance is found. After the new event is added to a support set for a fracture plane, new strike and dip values can be evaluated and if needed can be re-calculated (e.g., using the Chi-square fitting method, or another statistical or deterministic technique) for the fracture plane. Typically, re-calculating the fracture parameters causes limited change in the orientation due to the conditional control of the distance.

In some cases, when a new microseismic event is associated with a fracture plane, one or more parameters (e.g., distance residual, area, etc.) can be modified or optimized. The plane's distance residual r can represent the average distance from the supporting events to the plane. If the distance residual is less than the given residual tolerance T, the new event can be flagged to the associated events set for the plane. In some cases, an additional process, via which other associated events of the supporting set are taken-off the list, is launched and is terminated when the distance residual r falls within the given T. A fracture plane's area can represent the size of the fracture plane. Experience shows that usually a new event causes the fracture plane to propagate in length, grow in height, or both. Thus computational processes can be constrained by a non-decreasing area condition, whereby the new plane's area should grow larger than or remain equal to that of the original plane (rather than shrink) when the new event is added to the plane.

A fracture plane's orientation can represent the angle of the fracture plane. For example, a normal vector, the strike and dip angles, or other suitable parameters can be used to represent the fracture plane orientation. A change in a fracture plane's orientation (or other changes to a fracture plane) can cause some associated support events to be removed out of the associated events list to the un-associated event list based on their distance from the updated fracture plane. Additionally or alternatively, a change in a fracture plane's orientation can cause some previously-unassociated events to be assigned to the fracture plane based on their proximity to the updated fracture plane. Additionally, some events associated with nearby planes may also be associated with the current plane. If a new event is associated to two fracture planes, the fracture planes may intersect each other. In some cases, intersecting planes can be merged. If the new event does not belong to any existing fracture plane, it can be assigned to the "unassociated events" list.

The accumulated N microseismic events can be considered at any point to be a subset of the final post data event set. In such cases, the histogram or distribution of orientations based on the first N events may be different from the histogram or distribution of orientations constructed from the final post data. Some fracture planes extracted from N microseismic events may not be accurate, and this inaccuracy can decrease as time increases and more events are accumulated. As an example, accuracy and confidence may be lower at an initial time when the detected fracture planes are associated with microseismic events located close to the well bore. Such data may indicate fracture planes that are nearly parallel to the wellbore, even if those planes do not represent real fractures.

Fracture accuracy confidence can be used a measure for the certainty associated with fracture planes identified from microseismic data. In some cases, the accuracy confidence is identified in real time during the fracture treatment. The accuracy confidence can be determined from any suitable data using any suitable calculations. In some cases, the accuracy confidence value for a fracture plane is influenced by the number of microseismic events associated with the fracture plane. For example, the accuracy confidence value can scale (e.g., linearly, non-linearly, exponentially, polynomially, etc.) with the number of microseismic events according to a function. The number of microseismic events associated with a fracture plane can be incorporated (e.g., as a weight, an exponent, etc.) in an equation for calculating the accuracy confidence. In some cases, a fracture plane has a higher confidence value when the fracture plane is supported by a larger number of microseismic data points (or a lower confidence value when the fracture plane is supported by a smaller number of microseismic data points).

In some cases, the accuracy confidence value for a fracture plane is influenced by the location uncertainty for the microseismic events associated with the fracture plane. For example, the accuracy confidence value can scale (e.g., linearly, non-linearly, exponentially, polynomially, etc.) with the microseismic event's location uncertainty according to a function. The microseismic event's location uncertainty can be incorporated (e.g., as a weight, an exponent, or any decaying function of the distance, etc.) in an equation for calculating the accuracy confidence. In some cases, a fracture plane has a higher confidence value when the fracture plane is supported by microseismic data points having lower uncertainty (or a lower confidence value when the fracture plane is supported by microseismic data points having higher uncertainty).

In some cases, the accuracy confidence value for a fracture plane is influenced by the moment magnitude for the microseismic events associated with the fracture plane. For example, the accuracy confidence value can scale (e.g., linearly, non-linearly, exponentially, polynomially, etc.) with the microseismic event's moment magnitude according to a function. The microseismic event's moment magnitude can be incorporated (e.g., as a weight, an exponent, etc.) in an equation for calculating the accuracy confidence. The moment magnitude for a microseismic event can refer to the energy or intensity (sometimes proportional to the square of the amplitude) of the event. For example, the moment magnitude for a microseismic event can be a logarithmic scale value of the energy or intensity, or another type of value representing energy intensity. In some cases, a fracture plane has a higher confidence value when the fracture plane is supported by microseismic data points having higher intensity (or a lower confidence value when the fracture plane is supported by microseismic data points having lower intensity).

In some cases, the accuracy confidence value for a fracture plane is influenced by the distance between the fracture plane and the microseismic events associated with the fracture plane. For example, the accuracy confidence value can scale (e.g., linearly, non-linearly, exponentially, polynomially, etc.) with the average distance between the fracture plane and the microseismic events supporting the fracture plane. The average distance can be incorporated (e.g., as a weight, an exponent, etc.) in an equation for calculating the accuracy confidence. In some cases, a fracture plane has a higher confidence value when the fracture plane is supported by microseismic data points that are, on average, closer to the fracture plane (or a lower confidence value when the fracture plane is supported by microseismic data points that are, on average, farther from the fracture plane).

In some cases, the accuracy confidence value for a fracture plane is influenced by the fracture plane's orientation with respect to a dominant orientation trend in the microseismic data set. For example, the accuracy confidence value can scale (e.g., linearly, non-linearly, exponentially, polynomially, etc.) with the angular difference between the fracture plane's orientation and a dominant orientation trend in the microseismic data. The orientation angles can include strike, dip or any relevant combination (e.g., a three-dimensional spatial angle). The orientation can be incorporated (e.g., as a weight, an exponent, etc.) in an equation for calculating the accuracy confidence. A microseismic data set can have one dominant orientation trend or it can have multiple dominant orientation trends. Dominant orientation trends can be classified, for example, as primary, secondary, etc. In some cases, a fracture plane has a higher confidence value when the fracture plane is aligned with a dominant orientation trend in the microseismic data set (or a lower confidence value when the fracture plane is deviated from the dominant orientation trend in the microseismic data set).

A weighting value called the "weight of variation of fracture orientation" can represent the angular difference between the fracture plane's orientation and a dominant orientation trend in the microseismic data. The weight of variation of fracture orientation can be a scalar value that is a maximum when the fracture plane is aligned with a dominant orientation trend. The weight of variation of fracture orientation can be a minimum for fracture orientations that are maximally separated from a dominant fracture orientation trend. For example, when there is a single dominant fracture orientation trend, the weight of variation of fracture orientation can be zero for fractures that are perpendicular (or normal) to the dominant fracture orientation. As another example, when there are multiple dominant fracture orientation trends, the weight of variation of fracture orientation can be zero for fractures having orientations between the dominant fracture orientations. The weight of variation of the fracture orientation can be the ratio of the calculated plane's orientation and the orientation reflected by the homogeneous case.

In some cases, when there are multiple dominant fracture orientation trends, the weight of variation of fracture orientation has the same maximum value for each dominant fracture orientation trend. In some cases, when there are multiple dominant fracture orientations, the weight of variation of fracture orientation has a different local maximum value for each dominant fracture orientation. For example, the weight of variation of fracture orientation can be 1.0 for fractures that are parallel to a first dominant fracture orientation trend, 0.8 for fractures that are parallel to a second dominant fracture orientation trend, and 0.7 for fractures that are parallel to a third dominant fracture orientation trend. The weight of variation of fracture orientation can decrease to local minima between the dominant fracture orientations trend. For example, the weight of variation of fracture orientation between each neighboring pair of dominant fracture orientations can define a local minimum halfway between the dominant fracture orientations or at another point between the dominant fracture orientations.

The accuracy confidence parameter can be influenced by the supporting microseismic events' location uncertainty, the supporting microseismic events' moment magnitude, distance between the supporting microseismic events and the fracture plane, the number of supporting events associated with the plane, the weight of variation of fracture orientation, other values, or any appropriate combination of one or more of these. In some general models, the confidence increases as moment magnitude is larger, and as the variation of the fraction orientation becomes larger, and the number of supporting events is larger, and their accuracy in their location is larger, and as the variation of the weight as a function of the distance is larger. These factors can be used as inputs for defining weight in an equation for the accuracy confidence. For example, in some models, the weights are linear or nonlinear functions of these factors and the weight of variation of the fracture orientation may appear with higher weight when influencing the plane's confidence. In some examples, the accuracy confidence is calculated as:

$$\text{Confidence} = (\text{weight of variation of fracture orientation})*(\text{location uncertainty weight})*(\text{moment magnitude weight})*(\text{distance variation weight})). \quad (3)$$

Other equations or algorithms can be used to compute the confidence.

The identified fracture planes can be classified into confidence levels based on the fracture planes' accuracy confidence values. In some cases, three levels are used: low confidence level, medium confidence level and high confidence level. Any suitable number of confidence levels can be used. In some examples, when a new event is added to the supporting set associated with an existing fracture plane, its associated fracture confidence parameter may increase, which may cause the fracture plane to roll from its current confidence level to a higher one, if it exists. As another example, if a fracture's orientation diverts away from orientation trends exhibited by post microseismic event data, as microseismic events gradually accumulate, a decrease in fracture confidence may be induced, mainly by the weight of variation of fracture orientation, causing the plane to decrease its level to a lower confidence level, if it exists. This may particularly apply to fractures created at the initial time of hydraulic fracturing treatment; it may also apply to other types of fractures in other contexts.

Users (e.g., field engineers, operational engineers and analysts, and others) can be provided a graphical display of the fracture planes identified from the microseismic data. In some cases, the graphical display allows the user to visualize the identified planes in a real time fashion, in graphical panels presenting the confidence levels. For example, three graphical panels can be used to separately present the low confidence level, medium confidence level and high confidence level fracture planes. In some cases, the lower confidence level fracture planes are created in the initial times of the fracturing treatment. In some cases, higher confidence level fracture planes propagate in time in the direction nearly perpendicular to the wellbore. As new microseismic events gradually accumulate in time, the graphical display can be updated to enable users to dynamically observe the fracture planes association among confidence levels associated with the graphical panels.

The confidence level groups can be presented as plots of the fracture planes, or the confidence level groups can be presented in another format. The confidence level groups can be presented algebraically, for example, by showing the algebraic parameters (e.g., parameters for the equation of a plane) of the fracture planes in each group. The confidence level groups can be presented numerically, for example, by showing the numerical parameters (e.g., strike, dip, area, etc.) of the fracture planes in each group. The confidence level groups can be presented in a tabular form, for example, by presenting a table of the algebraic parameters or numerical parameters of the fracture planes in each group. Moreover, a fracture plane can be represented graphically in a three-dimensional space, a two-dimensional space, or another space. For example, a fracture plane can be represented in a rectilinear coordinate system (e.g., x, y, z coordinates) in a polar coordinate system (e.g., r, θ, φ coordinates), or another coordinate system. In some examples, a fracture plane can be represented as a line at the fracture plane's intersection with another plane (e.g., a line in the xy-plane, a line in the xz-plane, a line in the yz-plane, or a line in any arbitrary plane or surface).

In some cases, a graphical display allows users to track and visualize spatial and temporal evolution of specific fracture planes, including their generation, propagation and growth. For example, a user may observe stages of a specific fracture plane's spatial and temporal evolution such as, for example, initially identifying the fracture plane based on three microseismic events, a new event that changes the plane's orientation, a new event that causes the planes' area to grow (e.g., vertically, horizontally, or both), or other stages in the evolution of a fracture plane. The spatial and temporal evolution of fracture planes may present the travel paths of stimulated fluids and proppants injected into the rock matrix. Visualization of dynamics of fracture planes can help users better understand the hydraulic fracturing process, analyze the fracture complexity more accurately, evaluate the effectiveness of hydraulic fracture, or improve the well performance.

Although this application describes examples involving microseismic event data, the techniques and systems described in this application can be applied to other types of data. For example, the techniques and systems described here can be used to process data sets that include data elements that are unrelated to microseismic events, which may include other types of physical data associated with a subterranean zone. In some aspects, this application provides a framework for processing large volumes of data, and the framework can be adapted for various applications that are not specifically described here. For example, the techniques and systems described here can be used to analyze spatial coordinates, orientation data, or other types of information collected from any source. As an example, soil or rock samples can be collected (e.g., during drilling), and the concentration of a given compound (e.g., a certain "salt") as function of location can be identified. This may help geophysicists and operators evaluate the geo-layers in the ground.

FIG. 1A shows a schematic diagram of an example well system 100 with a computing subsystem 110. The example well system 100 includes a treatment well 102 and an observation well 104. The observation well 104 can be located remotely from the treatment well 102, near the treatment well 102, or at any suitable location. The well system 100 can include one or more additional treatment wells, observation wells, or other types of wells. The computing subsystem 110 can include one or more computing devices or systems located at the treatment well 102, at the observation well 104, or in other locations. The computing subsystem 110 or any of its components can be located apart from the other components shown in FIG. 1A. For example, the computing subsystem 110 can be located at a data processing center, a computing facility, or another suitable location. The well system 100 can include additional or different features, and the features of the well system can be arranged as shown in FIG. 1A or in any other suitable configuration.

The example treatment well 102 includes a well bore 101 in a subterranean zone 121 beneath the surface 106. The subterranean zone 121 can include one or less than one rock formation, or the subterranean zone 121 can include more than one rock formation. In the example shown in FIG. 1A, the subterranean zone 121 includes various subsurface layers 122. The subsurface layers 122 can be defined by geological or other properties of the subterranean zone 121. For example, each of the subsurface layers 122 can correspond to a particular lithology, a particular fluid content, a particular stress or pressure profile, or any other suitable characteristic. In some cases, one or more of the subsurface layers 122 can be a fluid reservoir that contains hydrocarbons or other types of fluids. The subterranean zone 121 may include any suitable rock formation. For example, one or more of the subsurface layers 122 can include sandstone, carbonate materials, shale, coal, mudstone, granite, or other materials.

The example treatment well 102 includes an injection treatment subsystem 120, which includes instrument trucks 116, pump trucks 114, and other equipment. The injection treatment subsystem 120 can apply an injection treatment to the subterranean zone 121 through the well bore 101. The injection treatment can be a fracture treatment that fractures the subterranean zone 121. For example, the injection treatment may initiate, propagate, or open fractures in one or more of the subsurface layers 122. A fracture treatment may include a mini fracture test treatment, a regular or full fracture treatment, a follow-on fracture treatment, a re-fracture treatment, a final fracture treatment or another type of fracture treatment.

The fracture treatment can inject a treatment fluid into the subterranean zone 121 at any suitable fluid pressures and fluid flow rates. Fluids can be injected above, at or below a fracture initiation pressure, above at or below a fracture closure pressure, or at any suitable combination of these and other fluid pressures. The fracture initiation pressure for a formation is the minimum fluid injection pressure that can initiate or propagate artificial fractures in the formation. Application of a fracture treatment may or may not initiate or propagate artificial fractures in the formation. The fracture closure pressure for a formation is the minimum fluid injection pressure that can dilate existing fractures in the subterranean formation. Application of a fracture treatment may or may not dilate natural or artificial fractures in the formation.

A fracture treatment can be applied by any appropriate system, using any suitable technique. The pump trucks 114 may include mobile vehicles, immobile installations, skids, hoses, tubes, fluid tanks or reservoirs, pumps, valves, or other suitable structures and equipment. In some cases, the pump trucks 114 are coupled to a working string disposed in the well bore 101. During operation, the pump trucks 114 can pump fluid through the working string and into the subterranean zone 121. The pumped fluid can include a pad, proppants, a flush fluid, additives, or other materials.

A fracture treatment can be applied at a single fluid injection location or at multiple fluid injection locations in a subterranean zone, and the fluid may be injected over a single time period or over multiple different time periods. In some cases, a fracture treatment can use multiple different fluid injection locations in a single well bore, multiple fluid injection locations in multiple different well bores, or any suitable combination. Moreover, the fracture treatment can inject fluid through any suitable type of well bore, such as, for example, vertical well bores, slant well bores, horizontal well bores, curved well bores, or any suitable combination of these and others.

A fracture treatment can be controlled by any appropriate system, using any suitable technique. The instrument trucks 116 can include mobile vehicles, immobile installations, or other suitable structures. The instrument trucks 116 can include an injection control system that monitors and controls the fracture treatment applied by the injection treatment subsystem 120. In some implementations, the injection control system can communicate with other equipment to monitor and control the injection treatment. For example, the instrument trucks 116 may communicate with the pump truck 114, subsurface instruments, and monitoring equipment.

The fracture treatment, as well as other activities and natural phenomena, can generate microseismic events in the subterranean zone 121, and microseismic data can be collected from the subterranean zone 121. For example, the microseismic data can be collected by one or more sensors 112 associated with the observation well 104, or the microseismic data can be collected by other types of systems. The microseismic information detected in the well system 100 can include acoustic signals generated by natural phenomena, acoustic signals associated with a fracture treatment applied through the treatment well 102, or other types of signals. For example, the sensors 112 may detect acoustic signals generated by rock slips, rock movements, rock fractures or other events in the subterranean zone 121. In some cases, the locations of individual microseismic events can be determined based on the microseismic data.

Microseismic events in the subterranean zone 121 may occur, for example, along or near induced hydraulic fractures. The microseismic events may be associated with pre-existing natural fractures or hydraulic fracture planes induced by fracturing activities. In some environments, the majority of detectable microseismic events are associated with shear-slip rock fracturing. Such events may or may not correspond to induced tensile hydraulic fractures that have significant width generation. The orientation of a fracture can be influenced by the stress regime, the presence of fracture systems that were generated at various times in the past (e.g., under the same or a different stress orientation). In some environments, older fractures can be cemented shut over geologic time, and remain as planes of weakness in the rocks in the subsurface.

The observation well 104 shown in FIG. 1A includes a well bore 111 in a subterranean region beneath the surface 106. The observation well 104 includes sensors 112 and other equipment that can be used to detect microseismic information. The sensors 112 may include geophones or other types of listening equipment. The sensors 112 can be located at a variety of positions in the well system 100. In FIG. 1A, sensors 112 are installed at the surface 106 and beneath the surface 106 in the well bore 111. Additionally or alternatively, sensors may be positioned in other locations above or below the surface 106, in other locations within the well bore 111, or within another well bore. The observation well 104 may include additional equipment (e.g., working string, packers, casing, or other equipment) not shown in FIG. 1A. In some implementations, microseismic data are detected by sensors installed in the treatment well 102 or at the surface 106, without use of an observation well.

In some cases, all or part of the computing subsystem 110 can be contained in a technical command center at the well site, in a real-time operations center at a remote location, in another appropriate location, or any suitable combination of these. The well system 100 and the computing subsystem 110 can include or access any suitable communication infrastructure. For example, well system 100 can include multiple separate communication links or a network of interconnected communication links. The communication links can include wired or wireless communications systems. For example, sensors 112 may communicate with the instrument trucks 116 or the computing subsystem 110 through wired or wireless links or networks, or the instrument trucks 116 may communicate with the computing subsystem 110 through wired or wireless links or networks. The communication links can include a public data network, a private data network, satellite links, dedicated communication channels, telecommunication links, or any suitable combination of these and other communication links.

The computing subsystem 110 can analyze microseismic data collected in the well system 100. For example, the computing subsystem 110 may analyze microseismic event data from a fracture treatment of a subterranean zone 121. Microseismic data from a fracture treatment can include data collected before, during, or after fluid injection. The computing subsystem 110 can receive the microseismic data at any suitable time. In some cases, the computing subsystem 110 receives the microseismic data in real time (or substantially in real time) during the fracture treatment. For example, the microseismic data may be sent to the computing subsystem 110 immediately upon detection by the sensors 112. In some cases, the computing subsystem 110 receives some or all of the microseismic data after the fracture treatment has been completed. The computing subsystem 110 can receive the microseismic data in any suitable format. For example, the computing subsystem 110 can receive the microseismic data in a format produced by microseismic sensors or detectors, or the computing subsystem 110 can receive the microseismic data after the microseismic data has been formatted, packaged, or otherwise processed. The computing subsystem 110 can receive the microseismic data by any suitable means. For example, the computing subsystem 110 can receive the microseismic data by a wired or wireless communication link, by a wired or wireless network, or by one or more disks or other tangible media.

Figure 2:
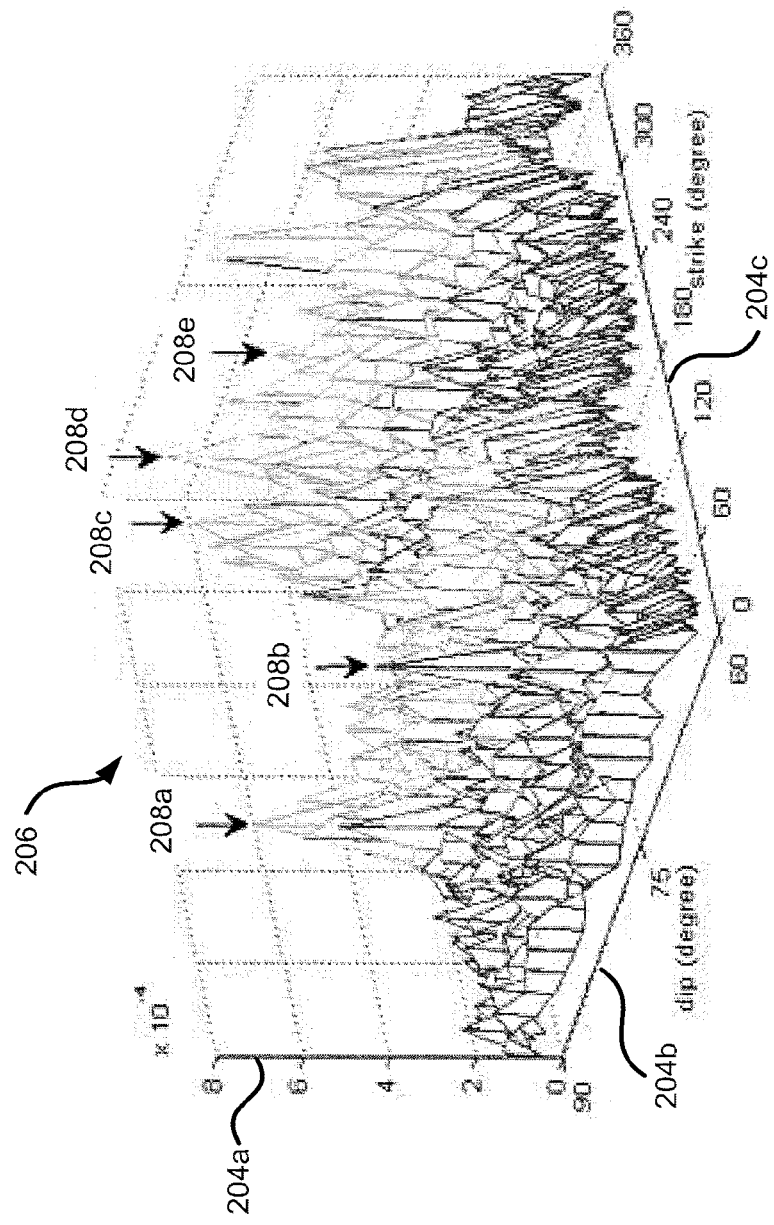
FIG. 2 is a plot showing an example histogram.

The computing subsystem 110 can be used to generate a histogram based on microseismic events. The histogram can be used, for example, to identify dominant fracture orientations in the subterranean zone 121. FIG. 2 shows an example of a histogram. The dominant fracture orientations can be identified, for example, based on local maxima in the histogram data. The dominant fracture orientations can correspond to the orientations of fracture families in the subterranean zone 121. In some cases, the microseismic data corresponding to each dominant fracture orientation are used to generate one or more fracture planes.

Some of the techniques and operations described herein may be implemented by a computing subsystem configured to provide the functionality described. In various embodiments, a computing device may include any of various types of devices, including, but not limited to, personal computer systems, desktop computers, laptops, notebooks, mainframe computer systems, handheld computers, workstations, tablets, application servers, storage devices, or any type of computing or electronic device.

Figure 1B:
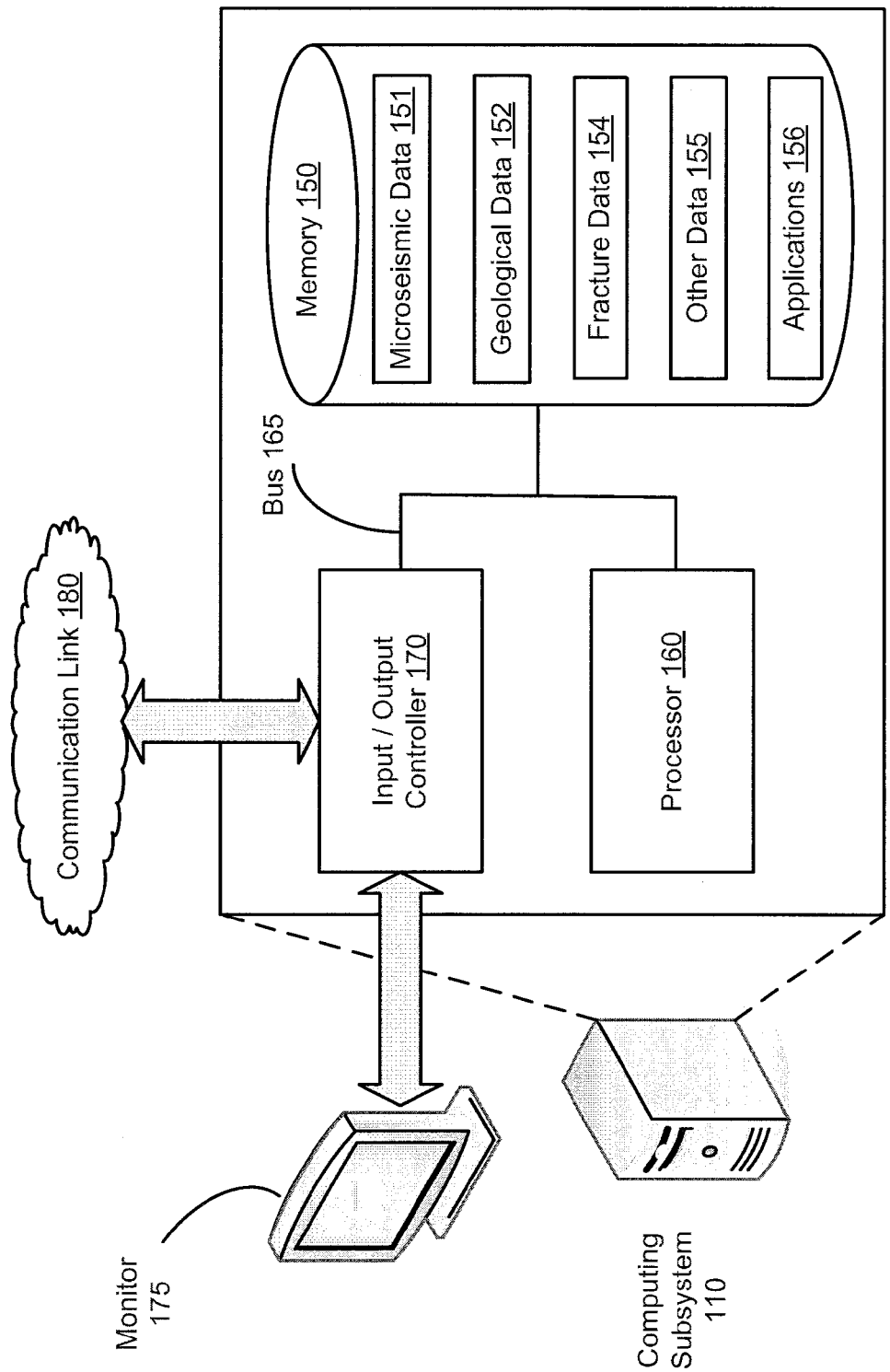
FIG. 1B is a diagram of the example computing subsystem 110 of FIG. 1A.

FIG. 1B is a diagram of the example computing subsystem 110 of FIG. 1A. The example computing subsystem 110 can be located at or near one or more wells of the well system 100 or at a remote location. All or part of the computing subsystem 110 may operate independent of the well system 100 or independent of any of the other components shown in FIG. 1A. The example computing subsystem 110 includes a processor 160, a memory 150, and input/output controllers 170 communicably coupled by a bus 165. The memory can include, for example, a random access memory (RAM), a storage device (e.g., a writable read-only memory (ROM) or others), a hard disk, or another type of storage medium. The computing subsystem 110 can be preprogrammed or it can be programmed (and reprogrammed) by loading a program from another source (e.g., from a CD-ROM, from another computer device through a data network, or in another manner). The input/output controller 170 is coupled to input/output devices (e.g., a monitor 175, a mouse, a keyboard, or other input/output devices) and to a communication link 180. The input/output devices receive and transmit data in analog or digital form over communication links such as a serial link, a wireless link (e.g., infrared, radio frequency, or others), a parallel link, or another type of link.

The communication link 180 can include any type of communication channel, connector, data communication network, or other link. For example, the communication link 180 can include a wireless or a wired network, a Local Area Network (LAN), a Wide Area Network (WAN), a private network, a public network (such as the Internet), a WiFi network, a network that includes a satellite link, or another type of data communication network.

The memory 150 can store instructions (e.g., computer code) associated with an operating system, computer applications, and other resources. The memory 150 can also store application data and data objects that can be interpreted by one or more applications or virtual machines running on the computing subsystem 110. As shown in FIG. 1B, the example memory 150 includes microseismic data 151, geological data 152, fracture data 153, other data 155, and applications 156. In some implementations, a memory of a computing device includes additional or different information.

The microseismic data 151 can include information on the locations of microseisms in a subterranean zone. For example, the microseismic data can include information based on acoustic data detected at the observation well 104, at the surface 106, at the treatment well 102, or at other locations. The microseismic data 151 can include information collected by sensors 112. In some cases, the microseismic data 151 has been combined with other data, reformatted, or otherwise processed. The microseismic event data may include any suitable information relating to microseismic events (locations, magnitudes, uncertainties, times, etc.). The microseismic event data can include data collected from one or more fracture treatments, which may include data collected before, during, or after a fluid injection.

The geological data 152 can include information on the geological properties of the subterranean zone 121. For example, the geological data 152 may include information on the subsurface layers 122, information on the well bores 101, 111, or information on other attributes of the subterranean zone 121. In some cases, the geological data 152 includes information on the lithology, fluid content, stress profile, pressure profile, spatial extent, or other attributes of one or more rock formations in the subterranean zone. The geological data 152 can include information collected from well logs, rock samples, outcroppings, microseismic imaging, or other data sources.

The fracture data 153 can include information on fracture planes in a subterranean zone. The fracture data 153 may identify the locations, sizes, shapes, and other properties of fractures in a model of a subterranean zone. The fracture data 153 can include information on natural fractures, hydraulically-induced fractures, or any other type of discontinuity in the subterranean zone 121. The fracture data 153 can include fracture planes calculated from the microseismic data 151. For each fracture plane, the fracture data 153 can include information (e.g., strike angle, dip angle, etc.) identifying an orientation of the fracture, information identifying a shape (e.g., curvature, aperture, etc.) of the fracture, information identifying boundaries of the fracture, or any other suitable information.

The applications 156 can include software applications, scripts, programs, functions, executables, or other modules that are interpreted or executed by the processor 160. Such applications may include machine-readable instructions for performing one or more of the operations represented in FIG. 4. The applications 156 may include machine-readable instructions for generating a user interface or a plot, such as, for example, the histogram represented in FIG. 2. The applications 156 can obtain input data, such as microseismic data, geological data, or other types of input data, from the memory 150, from another local source, or from one or more remote sources (e.g., via the communication link 180). The applications 156 can generate output data and store the output data in the memory 150, in another local medium, or in one or more remote devices (e.g., by sending the output data via the communication link 180).

The processor 160 can execute instructions, for example, to generate output data based on data inputs. For example, the processor 160 can run the applications 156 by executing or interpreting the software, scripts, programs, functions, executables, or other modules contained in the applications 156. The processor 160 may perform one or more of the operations represented in FIG. 4 or generate the histogram shown in FIG. 2. The input data received by the processor 160 or the output data generated by the processor 160 can include any of the microseismic data 151, the geological data 152, the fracture data 153, or the other data 155.

FIG. 2 is a plot showing an example histogram 200. The example histogram 200 shown in FIG. 2 is a graphical representation of the distribution of basic plane orientations identified from a set of microseismic data. A histogram can be generated based on other types of data, and a histogram can represent other types of information.

The example histogram 200 shown in FIG. 2 includes a plot of a surface 206 representing fracture plane orientation probabilities. In some cases, a histogram includes another type of plot. For example, a histogram can convey the same or similar information by a bar plot, a topographical plot, or another type of plot. In the example shown in FIG. 2, each fracture plane orientation is represented by two variables—the strike angle and the dip angle. A histogram can be used to represent a distribution of quantities over one variable, two variables, three variables, or more.

The surface 206 shown in FIG. 2 is plotted in a three-dimensional coordinate system. Some example histograms are plotted in two dimensions (e.g., for a distribution over a single variable), three dimensions (e.g., for a distribution over two variables), or four dimensions (e.g., for a distribution over two variables over time). In the example shown in FIG. 2, the three-dimensional coordinate system is represented by the vertical axis 204a and the two horizontal axes 204b and 204c. The horizontal axis 204b represents a range of dip angles, and the horizontal axis 204c represents a range of strike angles (units of degrees). The vertical axis 204a represents a range of probabilities.

Parameters of the histogram 200 can computed, for example, by generating bins that each represent a distinct orientation range or cluster. For example, a bin can represent a range of strike angles and a range of dip angles. In the histogram 200 shown in FIG. 2, each of the histogram bins corresponds to an intersection of sub-ranges along the horizontal axes 204b and 204c.

Additional parameters of the histogram 200 can be computed, for example, by computing the quantity of fracture orientations associated with each bin. In the histogram 200 shown in FIG. 2, the quantity for each bin is represented by the level of the surface 206 for each of the clusters represented in the plot. The quantities represented in FIG. 2 are normalized probability values. Generally, the quantity for each bin in a histogram can be a normalized quantity or a non-normalized quantity. For example, the quantity of fracture planes for each bin can be a probability value, a frequency value, an integer number value, or another type of value.

The quantity of fracture planes for each bin of the histogram can be computed, for example, by assigning each fracture plane to a bin, by counting the number of fracture planes having an orientation within the range represented by each bin, or by a combination of these and other techniques. In some cases, the fracture planes are basic planes defined by microseismic data points, and each of the basic planes defines an orientation corresponding to one of the bins.

The example histogram 200 represents the probability distribution of basic planes associated with 180 microseismic events. In this example, each bin represents a sub-range of strike values within the strike range indicated in the histogram 200 (0° through 360°) and a sub-range of dip values within the dip range indicated in the histogram 200 (60° through 90°). The surface 206 map exhibits several local maxima (peaks), five of which are labeled as 208a, 208b, 208c, 208d, and 208e in FIG. 2.

The peaks in the histogram 200 represent the bins associated with higher quantities than surrounding bins. The bins represented by the peaks correspond to a set of fracture planes having similar or parallel orientations. In some cases, each local maximum (or peak) in the histogram can be considered as corresponding to a dominant (i.e., principal) orientation trend. An orientation trend can be considered a dominant fracture orientation, for example, when more basic planes are aligned along this direction than along its neighboring or nearby directions. A dominant fracture orientation can represent a statistically significant quantity of basic planes that are either parallel, substantially parallel, or on the same plane.

The example shown in FIG. 2 is a histogram based on two angular parameters of each basic plane (i.e., strike and dip angles). A histogram can be based on other parameters of the basic planes. For example, a third parameter of each basic plane can be incorporated in the histogram data. The third parameter can be, for example, the distance d of the basic plane from the origin. A histogram can be generated for distance-related parameters, orientation-related parameters, or combinations of them. In some examples, a histogram can be generated for the values $d\tan(\theta)$ and $d\tan(\phi)$ for each basic plane, based on the distance d of each basic plane from the origin, the strike angle $\phi$ of each basic plane, and the dip angle $\theta$ of each basic plane. In some cases, a two dimensional histogram can be generated based on any two independent variables, such as, for example, $\tan(\theta)$, $\tan(\phi)$, the strike angle $\phi$, the dip angle $\theta$, or others.

Figure 3A:
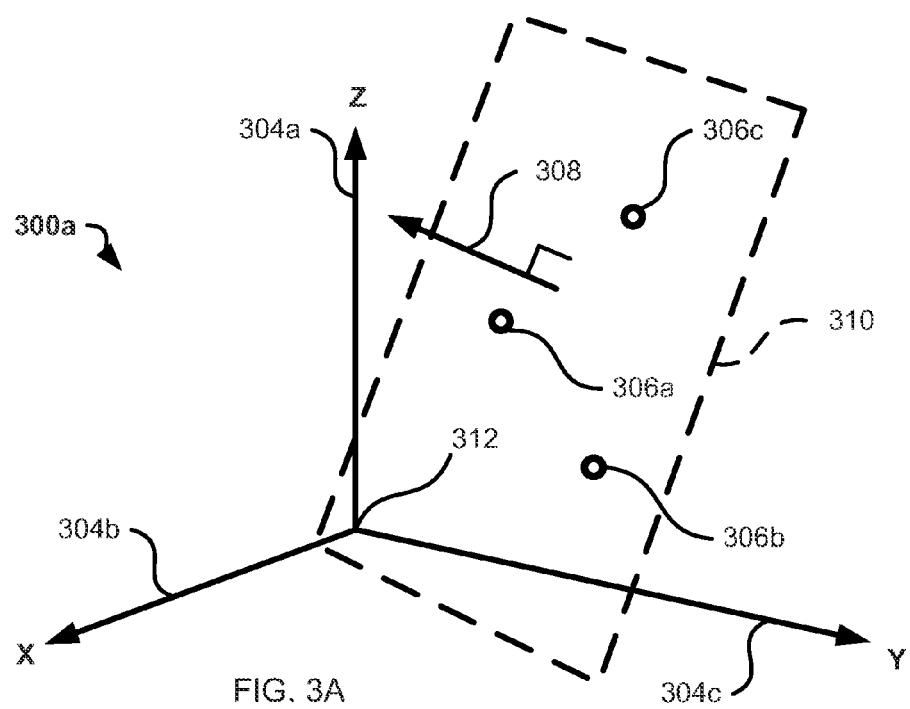
FIGS. 3A and 3B are plots showing an example fracture plane orientation.
Figure 3B:
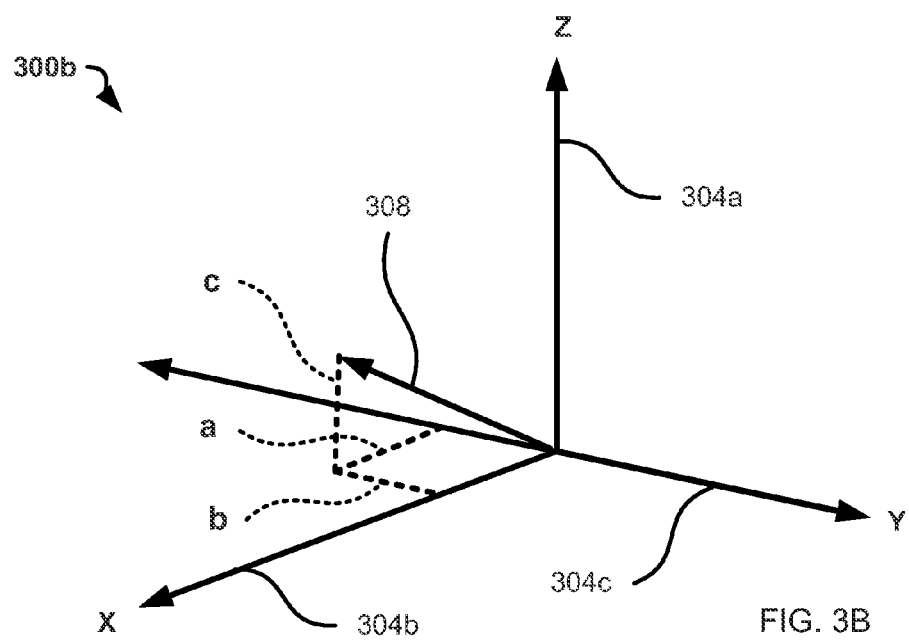

FIGS. 3A and 3B are plots showing an example fracture plane orientation. FIG. 3A shows a plot 300a of an example basic plane 310 defined by three non-collinear microseismic events 306a, 306b, and 306c. FIG. 3B shows a plot 300b of the normal vector 308 for the basic plane 310 shown in FIG. 3A. In FIGS. 3A and 3B, the vertical axis 304a represents the z-coordinate, the horizontal axis 304b represents the x-coordinate, and the horizontal axis 304c represents the y-coordinate. The plots 300a and 300b show a rectilinear coordinate system; other types of coordinate systems (e.g., spherical, elliptical, etc.) can be used.

As shown in FIG. 3A, the basic plane 310 is a two-dimensional surface that extends through the three-dimensional xyz-coordinate system. The normal vector 308 indicates the orientation of the basic plane 310. A normal vector can be a unit vector (a vector having unit length) or a normal vector can have non-unit length.

As shown FIG. 3B, the normal vector 308 has vector components (a, b, c). The vector components (a, b, c) can be computed, for example, based on the positions of the microseismic events 306a, 306b, and 306c, based on the parameters of the basic plane 310, or based on other information. In the plot 300b, the x-component of the normal vector 308 is represented as the length a along the x-axis, the y-component of the normal vector 308 is represented as the length b along the y-axis, and the z-component of the normal vector 308 is represented as the length c along the z-axis. (In the example shown, the y-component b is a negative value.)

The orientation of the basic plane 310 can be computed from the normal vector 308, the microseismic events themselves, parameters of the basic plane 310, other data, or any combination of these. For example, the dip $\theta$ and the strike $\phi$ of the basic plane 310 can be computed from the normal vector 308 based on the equations $$\theta = \arctan\frac{\sqrt{a^2 + b^2}}{c}, \varphi = \arctan\frac{b}{a}. \quad (1)$$

In some cases, computational techniques can account for and properly manage the sensitivity of these equations in extreme cases, for example, where the parameter a or c is very small.

In some cases, the orientation of one or more basic planes can be used as input for generating histogram data. For example, a histogram of the basic plane orientations can be generated from a set of basic planes. In some cases, the histogram data is generated by assigning each basic plane to a bin based on the basic plane's orientation ($\theta$, $\phi$) and computing the quantity of basic planes associated with each bin. In some cases, the histogram is plotted, or the histogram data can be used or processed without displaying the histogram.

Figure 4:
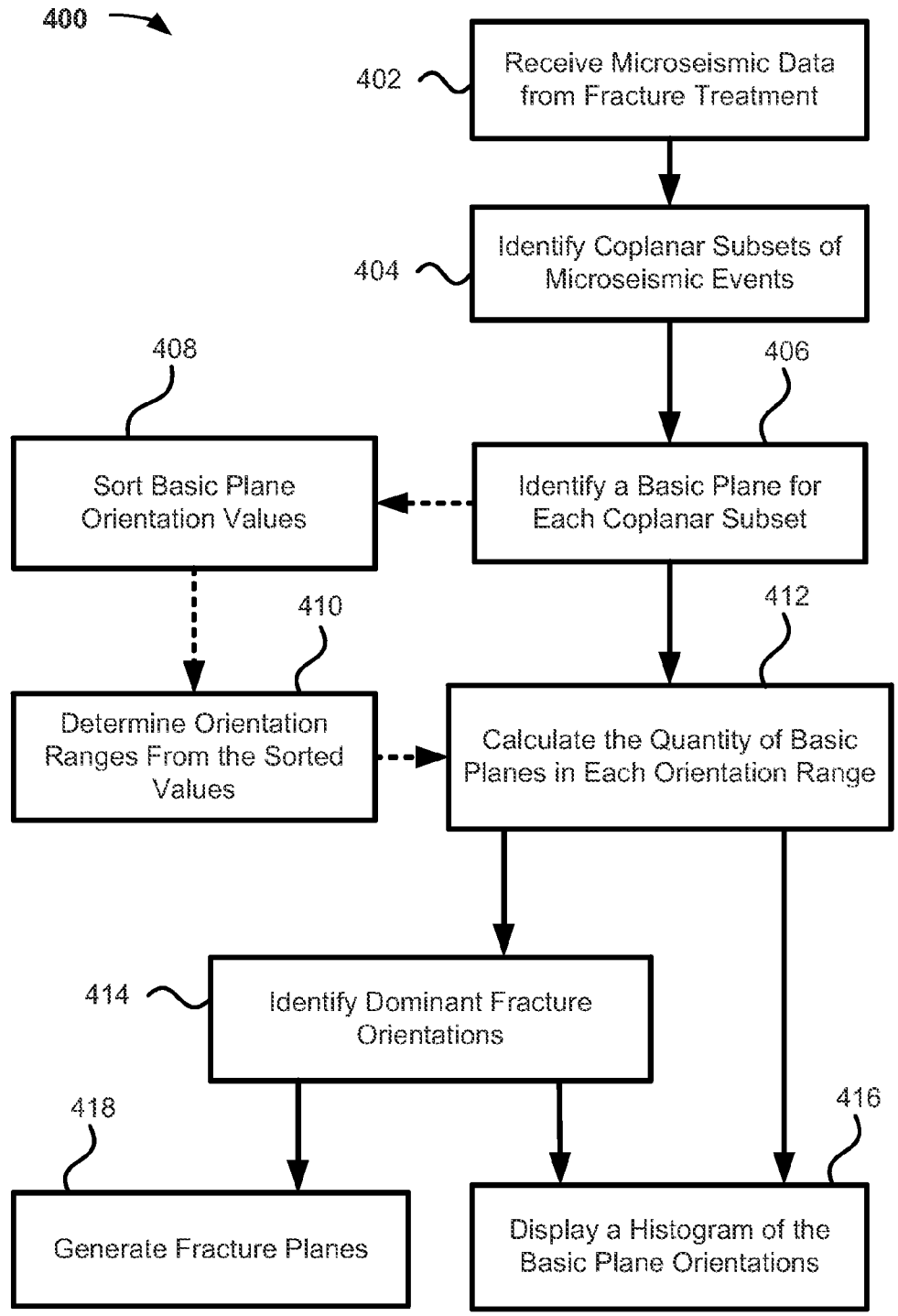
FIG. 4 is a flow chart of an example technique for identifying dominant fracture orientations.

FIG. 4 is a flow chart of an example process 400 for identifying dominant fracture orientations. Some or all of the operations in the process 400 can be implemented by one or more computing devices. In some implementations, the process 400 may include additional, fewer, or different operations performed in the same or a different order. Moreover, one or more of the individual operations or subsets of the operations in the process 400 can be performed in isolation or in other contexts. Output data generated by the process 400, including output generated by intermediate operations, can include stored, displayed, printed, transmitted, communicated or processed information.

In some implementations, some or all of the operations in the process 400 are executed in real time during a fracture treatment. An operation can be performed in real time, for example, by performing the operation in response to receiving data (e.g., from a sensor or monitoring system) without substantial delay. An operation can be performed in real time, for example, by performing the operation while monitoring for additional microseismic data from the fracture treatment. Some real time operations can receive an input and produce an output during a fracture treatment; in some cases, the output is made available to a user within a time frame that allows the user to respond to the output, for example, by modifying the fracture treatment.

In some cases, some or all of the operations in the process 400 are executed dynamically during a fracture treatment. An operation can be executed dynamically, for example, by iteratively or repeatedly performing the operation based on additional inputs, for example, as the inputs are made available. In some cases, dynamic operations are performed in response to receiving data for a new microseismic event (or in response to receiving data for a certain number of new microseismic events, etc.).

At 402, microseismic data from a fracture treatment are received. For example, the microseismic data can be received from memory, from a remote device, or another source. The microseismic event data may include information on the measured locations of multiple microseismic events, information on a measured magnitude of each microseismic event, information on an uncertainty associated with each microseismic event, information on a time associated with each microseismic event, etc. The microseismic event data can include microseismic data collected at an observation well, at a treatment well, at the surface, or at other locations in a well system. Microseismic data from a fracture treatment can include data for microseismic events detected before, during, or after the fracture treatment is applied. For example, in some cases, microseismic monitoring begins before the fracture treatment is applied, ends after the fracture treatment is applied, or both.

At 404, coplanar subsets of microseismic events are identified. A coplanar subset of microseismic events can include three microseismic events or more than three microseismic events. For example, each subset can be a triplet of microseismic event locations. In some cases, the coplanar subsets are identified by identifying all triplets in a set of microseismic event data. For example, for N microseismic event locations, $N(N-1)(N-2)/\theta$ triplets can be identified. In some cases, less than all triplets are identified as subsets. For example, some triplets (e.g., collinear or substantially collinear triplets) may be excluded.

At 406, a basic plane is identified for each coplanar subset of microseismic events. For example, a basic plane can be identified by calculating the parameters of a basic plane based on a triplet of microseismic event locations. In some cases, a plane can be defined by the three parameters a, b, and c of the basic plane model. These parameters can be calculated based on the x, y and z coordinates of three non-collinear points in a subset, for example, by solving a system of linear equations for the three parameters. For example, the parameters of a plane defined by three non-collinear events $(x_1, y_1, z_1)$, $(x_2, y_2, z_2)$ and $(x_3, y_3, z_3)$ can be computed based on solving the following system of equations:

$$ax + by + c + d = 0$$

$$a = \begin{bmatrix} 1 & y_1 & z_1 \\ 1 & y_2 & z_2 \\ 1 & y_3 & z_3 \end{bmatrix},$$

$$b = \begin{bmatrix} x_1 & 1 & z_1 \\ x_2 & 1 & z_2 \\ x_3 & 1 & z_3 \end{bmatrix},$$

$$c = \begin{bmatrix} x_1 & y_1 & 1 \\ x_2 & y_2 & 1 \\ x_3 & y_3 & 1 \end{bmatrix},$$

$$d = -\begin{bmatrix} x_1 & y_1 & z_1 \\ x_2 & y_2 & z_2 \\ x_3 & y_3 & z_3 \end{bmatrix}$$

At 408, the quantity of basic planes in each of a plurality of orientation ranges is calculated. The orientation ranges are defined by clusters of orientation values, and can correspond to histogram bins. In some cases, the bins collectively cover a full range of basic plane orientations, and each individual bin corresponds to a solid angle in three-dimensional space. A solid angle can be defined, for example, by a range of dip angles and a range of strike angles, or by angular ranges based on combinations of the strike angle and the dip angle.

The quantity of basic planes in each bin can be calculated, for example, by identifying the orientation of each basic plane, and determining which bin each basic plane's orientation resides in. In some cases, normal vectors are computed for all of the basic planes, and the basic plane orientations are computed from the normal vectors. In some cases, each basic plane orientation includes a strike angle and a dip angle for one of the basic planes. For example, the basic plane orientations can be computed using Equation 1 above. Other techniques can be used to compute a basic plane orientation.

In some implementations, the orientation ranges for each bin are pre-computed values. For example, the bins can be determined independent of the basic plane orientations. In some implementations, bins are determined based on the orientations of the basic planes identified at 406. For example, as shown in FIG. 4, the basic plane orientation values can be sorted at 408, and the bins can be identified from the sorted basic plane orientation values at 410 (e.g., using some clustering methodology, nearest-neighbor schemes, etc.).

In some cases, the bins are identified from clustered sets of the orientation values. For example, the bins can be identified by sorting the strike angles, identifying clusters of the sorted strike angles, sorting the dip angles, identifying clusters of the sorted dip angles, and defining the bins based on the clusters of sorted strike angles and the clusters of sorted dip angles.

Figure 5:
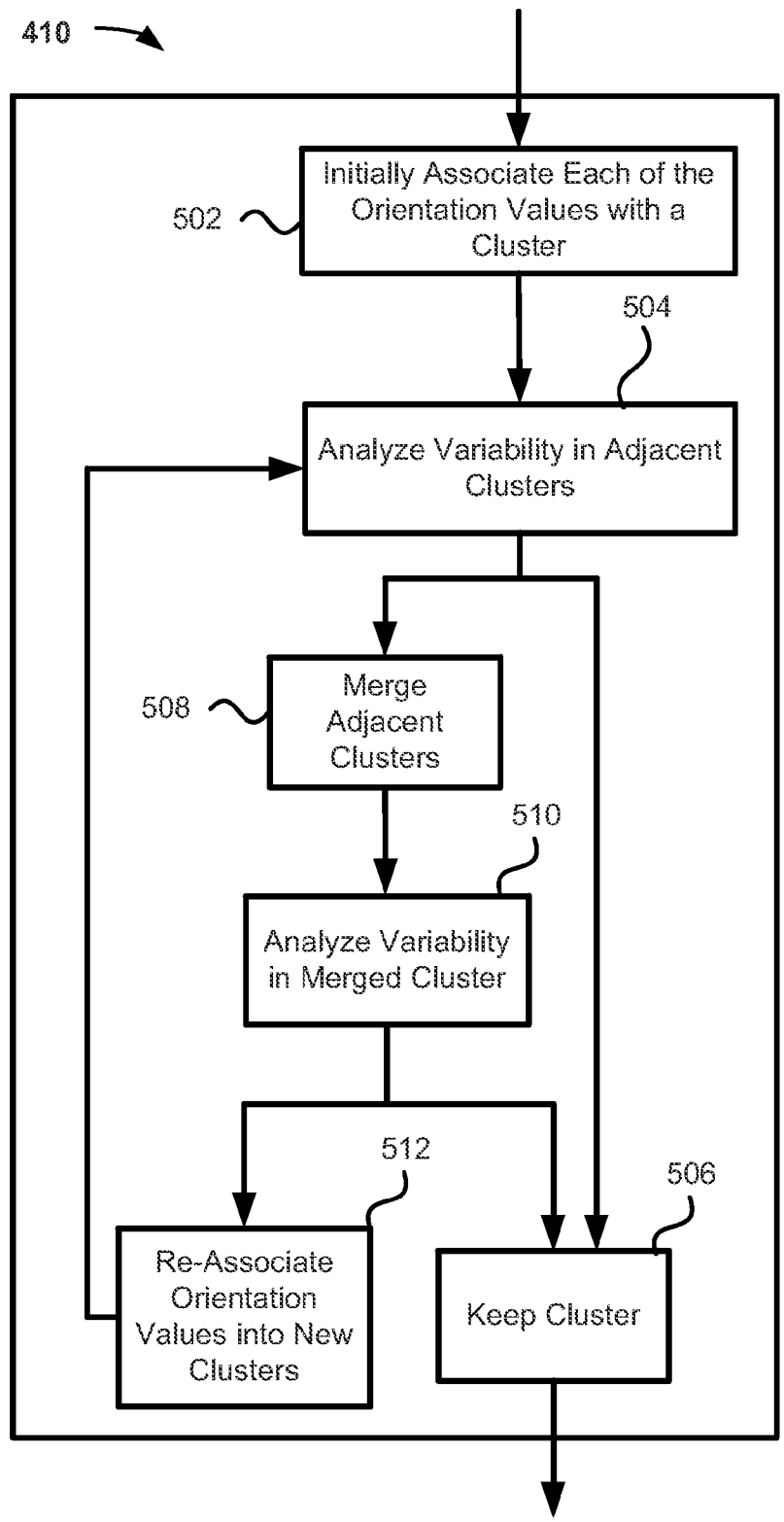
FIG. 5 is a flow chart of an example iterative technique for identifying clusters of orientation values.
Figure 6:
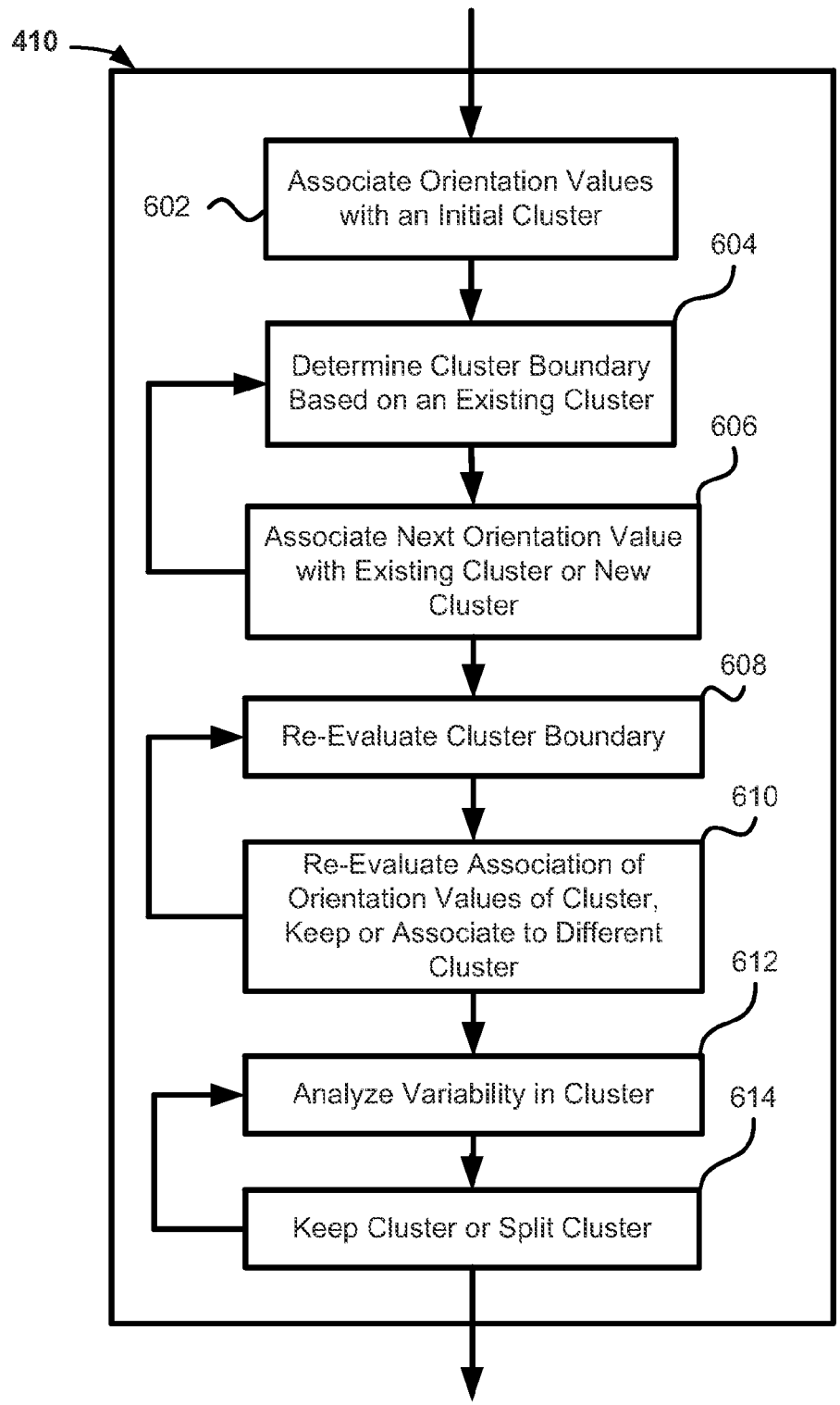
FIG. 6 is a flow chart of an example dynamic technique of identifying clusters of orientation values.

The clusters can be determined from basic plane orientation values in a number of different manners. FIG. 5, discussed in more detail below, depicts an example of an iterative method for identifying clusters of orientation values. FIG. 6, discussed in more detail below, depicts an example of a dynamic method of identifying clusters of orientation values. The clusters can be determined from basic plane orientation values in other different manners, as well.

At 412, the quantity of basic planes in each bin is calculated. The quantity of basic plane orientations can be a probability value, a frequency value, an integer number of planes, or another type of value. For example, the quantity of basic planes in a given cluster can be the number of basic planes having a basic plane orientation associated to the given cluster. As another example, the quantity of basic planes in a given cluster can be the number of basic planes having a basic plane orientation associated to the given orientation range, divided by the total number of basic planes identified. The quantities can be normalized, for example, so that the quantities sum to one (or another normalization value). Example techniques for identifying the quantities are described herein, for example, in the sections entitled "Identifying Orientation Clusters From Microseismic Data" and "Updating Histogram Data."

At 414, dominant fracture orientations are identified from the quantities calculated at 412. The dominant fracture orientations can be identified, for example, as the clusters having the local higher maxima of basic plane orientations. In some cases, the dominant fracture orientations are identified based on the local maxima in histogram data generated from the quantities. A single dominant fracture orientation can be identified, or multiple dominant fracture orientations can be identified. In some cases, a dominant fracture orientation is identified based on the height, width, and other parameters of a peak in the histogram data. The dominant fracture orientation can be identified as the center point of a cluster, the dominant fracture orientation can be computed as the mean orientation of basic planes in the cluster, or the dominant fracture orientation can be computed in another manner.

A dominant fracture orientation identified from the quantities calculated at 412 can represent the orientation of physical fractures within the subterranean zone. In some rock formations, fractures typically form in sets (or families) having parallel or similar orientations. Some formations include multiple sets of fractures. For example, a formation may include a first set of fractures having a primary orientation, which may be dictated by a maximum stress direction. A formation may also include a second set of fractures having a secondary orientation, which is different from the primary orientation. The secondary orientation may be separated from the primary orientation, for example, by ninety degrees or by another angle. In some cases, each of the dominant fracture orientations corresponds to the orientation of a fracture set in a subterranean zone.

In some cases, the dominant fracture orientation is identified according to an algorithm or technique that is capable of getting any preference orientation, for example, based on the physics or any other information. The algorithm can identify how strongly the data indicate the dominance of this orientation (e.g., based on a confidence value between 0 and 1), and the algorithm can take this information into account when generating the various prime orientation trends.

At 416, a histogram of the basic plane orientation values is displayed. The histogram indicates the quantity of basic plane orientations in each of the clusters. An example histogram is shown in FIG. 2. The quantities can be displayed in another format or as another type of histogram. A histogram can be plotted, for example, in two dimensions or three dimensions. In some cases, the histogram is plotted as a continuous line or surface, as an array of discrete glyphs (e.g., a bar chart), as topographical regions, or as another type of graphical presentation. In addition to presenting a histogram, or as an alternative to presenting a histogram, the basic plane orientation values can be presented as numerical values, algebraic values, a numerical table, or in another format.

At 418, fracture planes are generated. The fracture planes can be generated, for example, based on the microseismic data points and the dominant fracture orientations identified at 414. In some cases, a cluster of microseismic events associated with each of the dominant fracture orientations is identified, and a fracture plane is generated from each cluster. In some cases, the fracture planes are identified based on the locations and other parameters of the measured microseismic events. For example, a fracture can be generated by fitting the individual clusters of microseismic events to a plane. Other techniques can be used to generate a fracture plane. Example techniques for generating fracture planes from microseismic data are described herein, for example, in the sections entitled "Analyzing Microseismic Data from a Fracture Treatment," "Managing Microseismic Data for Fracture Matching," "Identifying Fracture Planes from Microseismic Data," and "Propagating Fracture Plane Updates."

In some cases, the algorithm can get an external input (e.g., from the user, from other physical considerations, etc.). The external input can include information, such as, for example, a given orientation is likely to be a prime orientation (thus carrying a pre-defined confidence tag), a given orientation is less likely to have planes in this direction (thus having a very small confidence level, or even zero). These types of inputs may bias the computation of the planes imbedded in the microseismic data set to reflect these preferences.

In some cases, the histogram is displayed in real time during the fracture treatment, and the histogram can be updated dynamically as additional microseismic events are detected. For example, each time a new microseismic event is received, additional basic planes can be identified and the quantity of basic planes in each cluster can be updated accordingly. In some cases, the clusters are also updated dynamically as microseismic data is received. Example techniques for updating a histogram based on additional microseismic data are described herein, for example, for example, in the section entitled "Updating Histogram Data."

In some cases, the fracture planes are updated in real time, for example, in response to collecting microseismic data. Example techniques for updating fracture planes from microseismic data are described herein, for example, in the sections entitled "Analyzing Microseismic Data from a Fracture Treatment," "Managing Microseismic Data for Fracture Matching," "Identifying Fracture Planes from Microseismic Data," and "Propagating Fracture Plane Updates." In some cases, a confidence level for each fracture plane can be modified (e.g., increased, decreased) based on new microseismic data. In some cases, a new fracture plane can be created or a previously-generated fracture plane can be eliminated based on new microseismic data.

Turning now to FIGS. 5 and 6, as discussed above, FIG. 5 depicts an example of an iterative method for identifying clusters of orientation values and FIG. 6 depicts an example of a dynamic method of identifying clusters of orientation values. Other examples exist. However, both example methods described herein are adaptive in that the number and orientation ranges of the clusters are not pre-set. Rather, the number and orientation ranges are determined as the orientation values are being associated to clusters based on the extent of variation in the orientation values themselves, and the number and the orientation ranges of all the clusters is not determined until all of the orientation values being clustered have been assigned to a cluster. Because the methods are adaptive, the orientation ranges of the clusters need not be uniform, and typically some clusters will have different orientation ranges than others. In some cases, the adaptive nature of the methods enables the number and orientation ranges of the clusters to automatically adjust to better reflect the major trends and features of the data.

As an initial matter, it is not necessary to process and cluster all of the orientation values defined from an entire set of microseismic data. Rather, a subset of the data can be processed and its orientation values clustered. A subset that is a random sample of the data can yield an accurate or reasonably accurate representation of the entire data set. Thus, if presented with a large set of data, processing a random subset of the data can enable providing a solution (i.e., the clusters) in a shorter period of time and with less processing than processing the entire data set. Processing a subset of the data can enable providing a preview of the solution based on the subset first, while the entire data set is being processed. In some cases, multiple subsets of the data can be processed using one or both of the example methods herein. Because similar data sets processed using the example methods herein will produce congruent solutions (i.e., clusters), the solutions from the multiple data subsets, for example random, non-overlapping subsets from the same superset, can be combined to provide a solution based on the larger set of the data. Processing and then combining the solutions from multiple data subsets can facilitate parallel processing of the data. For example, a subset of the data or the entire data set can be split into a number of subsets corresponding to the number of processors, computers or parallel threads. Each processor, computer or parallel thread can generate its own clusters of orientation values in parallel, and in less time than it would have taken to process the same amount of data at the same rate in a single thread. Thereafter, the clusters from each of the parallel processes can be combined into a single solution.

Referring to FIG. 5, the iterative method is iterative in that the number and orientation ranges of the clusters are iteratively determined by repeatedly merging and splitting an initial set of clusters, based on the extent of variation in the clusters. Because the process is iterative, the number of clusters and the range of orientations associated with each cluster is not determined until the iterations are ceased, for example, when number of clusters stabilizes and converge (e.g., at an optimum or near optimum solution where there is little or no need to continue to iterate) or at some other stopping point. Further, the iterations may yield a solution where different clusters have different ranges of orientations (i.e., the clusters are not all the same angular range). In some cases, the iterations can converge to an optimum set of clusters, with each iteration successively improving the clusters. Notably, although it is discussed above that the orientation values are first sorted (at 408, FIG. 4), it is not necessary to sort the orientation values for the iterative method and the operation can be omitted. The iterative method, whether performed on sorted data or unsorted data will reach the same statistical solution (i.e., similar clusters), but the method performed on unsorted data may require additional iterations to reach the solution. In some cases, it may be faster to perform the iterative method on unsorted data, than to sort the data and then perform the iterative method.

To this end, at 502, a plurality of clusters are formed by initially associating each of the orientation values with a cluster. The manner of initially clustering the orientation values is selected to produce a number of clusters that can be manageable processed. In some cases, the manner of initially clustering the orientation values is selected to produce a smallish number of clusters, for example, 3 to 5 clusters. However, other numbers of initial clusters could be produced.

In some cases, the initial clusters can be defined based on a fixed, specified maximum orientation range. There are a number of different manners of implementing fixed angular orientation ranges that can be used. However, in one example, the total angular range of orientation values or possible orientation values in the data set is divided evenly into equal angular ranges, each angular range corresponding to a bin. Thereafter, orientation values are associated with bins, and thus clustered, based on whether their value falls within a bin's angular range.

In some cases, the clusters can each have a fixed, specified maximum range defined from an angular difference measured between adjacent orientation values associated with the same cluster. For example, a new orientation value is associated to a cluster if the smallest angular distance between the orientation value and a representative orientation value of the cluster (i.e., the adjacent orientation value) is smaller than a specified maximum angular difference. For example, the representative value can be the value of one of the cluster's members that generates the maximum difference. For example, the representative value can be the average value of the members of the cluster. For example, there are other possibilities to choose the representative value of the cluster. The angular difference can be characterized as a threshold value. If an orientation value cannot be associated with an existing cluster, a new cluster is generated. The process is repeated for each orientation value being analyzed until all orientation values in the set have been associated with a cluster.

In some cases, the clusters can have a specified maximum range that is variable, defined from a characteristic of the orientation values or clusters. For example, the range can be determined based on the extent of variation in the orientation values, such as a function of a standard deviation, an angular span of orientation values, or another measure of variation. There are a number of different manners of implementing variable ranges that can be used. However, in one example, the threshold angular span (T) is:

$$T = \alpha \cdot d_{min} + (1-\alpha) \cdot d_{max} \quad (4)$$

where $d_{min}$ is the smallest angular distance between adjacent orientation values in a cluster being defined and $d_{max}$ is the largest angular distance between adjacent orientation values in the cluster being defined, and $\alpha = 1 - \exp(-\gamma \cdot \sigma/\mu)$, where $\gamma$ is an influence factor, $\sigma$ is the standard deviation of the angular distance between adjacent orientation values in the cluster being formed, and $\mu$ is the mean of the orientation values in the cluster being formed. In some cases, $\gamma$ is between 0.5 and 1. Still other examples for variable angular ranges exist.

Once some or all of the orientation values have been associated with clusters, the extent of variation in pairs of adjacent clusters is analyzed to determine whether to keep the clusters or re-evaluate the clusters. At 504 a pair of adjacent clusters is analyzed. If a high extent of variation is found in the adjacent clusters (e.g., over a specified degree of variation), at 508, the clusters are merged. If the variation is not high, at 506, one of the clusters can be kept and, as discussed below, the analysis, at 504, is performed on the other cluster and a cluster adjacent to it.

The extent of variation in a cluster can be calculated as a function of a standard deviation, an angular span of orientation values, or by another measure of variation. In one example, the extent of variation in a cluster is characterized by a characteristic number (C) where:

$$C = m \cdot \sigma \quad (5)$$

or $$C = m \cdot \sigma/\mu \quad (6)$$

where m is the number of orientation values in the cluster, $\sigma$ is the standard deviation of the angular distance between adjacent orientation values in the cluster, and $\mu$ is the mean of the orientation values in the cluster. Thus, two adjacent clusters are merged if both have a value of C that is greater than a specified merge value.

At 510, the extent of variation in the merged cluster is analyzed to determine whether to keep the merged cluster or split the cluster using a different specified maximum range. If the extent of variation in the merged cluster is high (e.g., over a specified degree of variation), at 512, the orientation values in the merged cluster are re-associated with two new clusters using the different specified maximum range. If the variation is not high, at 506, the merged cluster is kept. As above, the extent of variation in the merged cluster can be calculated as a function of a standard deviation, an angular span of orientation values, or by another measure of variation. In one example, the extent of variation is characterized by the characteristic number (C) and the merged cluster is split if the value of C is greater than a specified split value.

The different specified maximum range used to split a previously defined cluster can be based on the extent of variation of the orientation values in the cluster or in other clusters. As above, the extent of variation in the merged cluster can be calculated as a function of a standard deviation, an angular span of orientation values, or by another measure of variation. In one example, a specified threshold angular span, such as:

$$T = \alpha \cdot d_{min} + (1-\alpha) \cdot d_{max} \quad (4)$$

discussed above, can be used to associate the orientation values to clusters. In another example, the specified threshold angular span can be:

$$T = (\max(d) + \min(d))/2 \quad (5)$$

where max(d) is the largest angular span between adjacent orientation values of two adjacent, existing clusters and min (d) is the smallest angular span between adjacent orientations of two adjacent, existing clusters. Other examples of exist.

Iterations of 504 to 512 are repeated for each of the clusters in the initial set of clusters. Iterations of 504 to 512 are also repeated for any new clusters generated by merging (at 508) and any new clusters generated by splitting (at 512), and if yet further new clusters are generated, for these clusters, and so on. Eventually, however, the iterations converge monotonically to a solution where no new clusters are generated or the number of clusters will remain constant as the iterations of 504 to 512 are performed. In some cases, the iterations can converge to an optimum set of clusters, with each iteration successively improving the clusters. The iterations, however, can produce a useful solution prior to complete convergence. Therefore, one may choose to cease the iterations, and keep all the clusters, prior to convergence. In some cases, one may choose to cease the iterations when the rate of change in the number of clusters is below a specified rate, when the clusters with the highest number of orientation values stabilize or have an accuracy confidence value above a certain specified confidence value, after a certain specified number of iterations, or based on some other criteria. In some cases, an accuracy confidence value can be computed for a cluster based on the number of orientation values associated to the cluster, the extent of variation in the orientation values associated to the cluster, and the location uncertainty of the underlying microseismic events used to define the basic planes of the orientation values, other values, or any appropriate combination of one or more of these.

Turning to FIG. 6, the dynamic method is dynamic in that the orientation ranges of each of the clusters is determined dynamically and adaptively based on the extent of variation in the clusters as a cluster is generated. In the method, at 602, an initial cluster is formed by associating two or more adjacent orientation values to the initial cluster. For example, the first two or more adjacent orientation values at an end of the sorted orientation values are assigned to the initial cluster. For convenience of reference, the method is described herein with respect to processing the orientation values in descending order, and thus the first two values are the two largest orientation values; however, the method could be performed in ascending order.

At 604 the boundary of the cluster being defined, here the initial cluster, is determined based on the extent of variation in the cluster as it is being defined, for example, as a function of a standard deviation, an angular range of orientation values, or another measure of variation. The boundary of the cluster can be determined as a specified maximum orientation range, for example, specified as a threshold angular span (T). The specified maximum can be determined as a function of a fixed or variable tuning variable and the extent of variation in the cluster. There are a number of manners of determining the boundary of the cluster. However, in one example, the threshold angular span (T) is:

$$T=\beta*\mu \quad (7)$$

where β is the tuning variable and μ is the mean of the orientation values in the cluster. In a fixed tuning variable example, β is constant. In some cases, β is much less than one. In some cases, β=0.1. Other values of β, however, can be used. In a varying tuning variable example:

$$\beta=\tau_\beta*\sigma \quad (8)$$

where $\tau_\beta$ is a constant, and σ is the standard deviation of the angular distance between adjacent orientation values in the cluster. In another varying tuning variable example:

$$\beta=\tau_\beta*(d_{max}-d_{min}) \quad (9)$$

where $\tau_\beta$ is a constant, and $d_{min}$ is the smallest distance between orientation values in the cluster and $d_{max}$ is the largest distance between orientation values in the cluster. In some cases, $\tau_\beta$ is 2 or 3. Other values of $\tau_\beta$, however, can be used.

In yet another example, the threshold angular span (T) is:

$$T=\beta*(\mu-\tau_L*\sigma_L) \quad (10)$$

where μ is the mean of the orientation values in the cluster, $\tau_L$ is a tuning variable and, if the orientations are being analyzed in descending order, $\sigma_L$ is the angular distance between the highest orientation value in the cluster being formed and the lowest orientation value of the angularly preceding cluster. In some cases, $\tau_L$=0.5 and β=0.1 through 1. Other values of $\tau_L$ and β, however, can be used. In this example, the upper boundary of the cluster can be initially defined as:

$$T_U=\beta*(\mu+\tau_R*\sigma) \quad (11)$$

where $\tau_R$ is a tuning variable and σ is the standard deviation of the angular distance between adjacent orientation values in the cluster. In some cases, $\tau_R$ is initially 1 or 2 and β=0.1 through 1. Other values of $\tau_L$ and β, however, can be used. Stated differently, for a given orientation value (O) to be associated with a cluster the following must be true:

$$\beta*(\mu-\tau_L*\sigma_L) \leq O \leq \beta*(\mu+\tau_R*\sigma) \quad (12)$$

At 606, the next orientation value in the sorted list is either associated with the cluster being formed or the orientation value begins a new cluster. For example, the orientation value is compared against the threshold (T). If it falls within the threshold, the orientation value is associated to the cluster, and if it does not fall within the threshold, it begins a new cluster. In an instance, where an upper threshold ($T_U$) is determined, the orientation value is also compared against the upper threshold in determining whether to associate the orientation value with the cluster.

Operations 604 and 606 are repeated for each of the orientation values being analyzed, until each of the orientation values being analyzed are associated with a cluster and each of the clusters are set.

In some cases, at 608, the boundary of a completed cluster can be re-evaluated as more information becomes available. For example, the cluster is complete when operations 604 and 606 are no longer associating orientation values to it, and a new adjacent cluster has been formed. The upper boundary of the cluster can then be more precisely defined as:

$$T_U=\beta*(\mu+\tau_R*\sigma_R) \quad (13)$$

Where, if the orientations are being analyzed in descending order, $\sigma_R$ is the angular distance between the lowest orientation value in the cluster being analyzed and the highest value in the next adjacent cluster. In some cases, $\tau_R$=0.5. Stated differently, for each orientation value (O) associated with the cluster being analyzed, the following must be true:

$$\beta*(\mu-\tau_R*\sigma_L) \leq O \leq \beta*(\mu+\tau_L*\sigma_R) \quad (14)$$

If not, then the value is associated with a different cluster, for example, the angularly preceding cluster if its value exceeded $T_U$ or the next adjacent cluster if its value exceeded T.

At 610 the association of each orientation value in a cluster is re-evaluated in light of the re-evaluated cluster boundaries, and based on this re-evaluation, each orientation is maintained associated with the cluster or assigned to a new cluster.

Operations 608 and 610 are repeated for each of the clusters being analyzed. In some cases, operations 608 and 610 can be performed after all of the clusters have been defined via operations 604 and 606. In some cases, operations 608 and 610 can be performed while clusters are being defined via operations 604 and 606, i.e., in parallel with and trailing operations 604 and 606 for example by another computer, processor or thread. For example, operations 608 and 610 can be performed on a cluster after the cluster is initially defined, and while operations 604 and 606 are working to define an adjacent or subsequent cluster. Performed in parallel, the operations can take less time than it would have taken to process the same amount of data at the same rate in a single thread.

In some cases, the extent of variation in the completed clusters can be analyzed to determine whether to keep the cluster or split the clusters. At 612, a cluster is analyzed, and if a high extent of variation is found (e.g., over a specified degree of variation) and if the cluster has a high number of orientation values (e.g., over a specified number) then, at 614, the cluster is split. If the variation is not high or the number of orientation values is not high, then the cluster is kept. The extent of variation can be calculated as a function of a standard deviation, the angular span of the cluster, or by another measure. There are a number of different manners that can be used to determine to keep or split a cluster. However, in one example, the extent of variation is determined by finding the maximum angular distance between any two adjacent orientation values in the cluster. If that maximum angular distance is larger than a tuning variable (τS) times the angular distance to adjacent orientation values on either side, then the variation is determined to be high. In the example, the number of orientation values is determined to be high if the cluster being analyzed contains twice as many orientation values as any other cluster. If it is determined to split the cluster, then the cluster is split into two clusters at the location of maximum angular distance between any two adjacent orientation values in the cluster.

612 and 614 are repeated for each of the clusters being analyzed. In some cases, operations 612 and 614 can be performed after all of the clusters have been defined via operations 604 and 606 and/or re-evaluated via operations 608 and 610. In some cases, operations 612 and 614 can be performed while clusters are being defined via operations 604 and 606 and/or re-evaluated via operations 608 and 610, i.e., in parallel with and trailing operations 604-610 for example by another computer, processor or thread. Performed in parallel, the operations can take less time than it would have taken to process the same amount of data at the same rate in a single thread.

Bins can be identified from clustered sets of the orientation values obtained by either technique, FIG. 5 or FIG. 6, and can subsequently be used in operations 412-418 of FIG. 4 above to identify dominant fracture orientations, generate a histogram of the basic plane orientations, and generate fracture planes.

As mentioned above, the fracture matching algorithms described herein, including the techniques described in connection with FIG. 4, can operate on real-time data, post data, or a combination of real-time and post data. In connection with performing the fracture matching algorithms, the clustering, including clustering by the techniques described in connection with FIGS. 5 and 6, can be performed on real-time data, post data, or a combination of real-time and post data. In instances where the fracture matching is performed on real-time or other not post data, the algorithms can be operated to update the identified fracture orientations as new data comes in. When new data comes in, wither it is single microseismic event or multiple microseismic events, the techniques described in connection with FIG. 4 and FIG. 5 or 6 can be performed to generate updated fracture planes and/or generate an updated histogram of the basic plane orientations. In some cases, whether the analysis is performed on entirely post data, on partially post data and partially not post data, or on entirely not post data (including, real-time data), the clustering techniques described in connection with FIGS. 5 and 6 can reach the same statistical solution.

Figure 7:
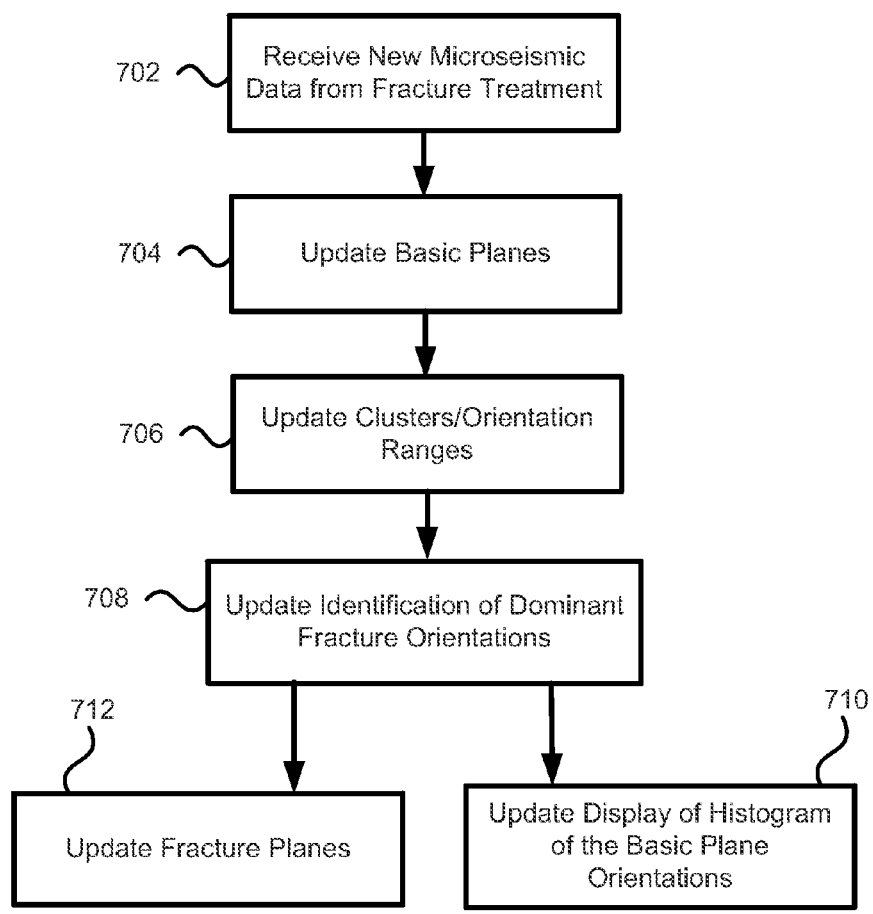
FIG. 7 is a flow chart of an example technique for updating the analysis herein based on new microseismic data.

To this end, referring to FIG. 7, a new data is received at 702. The techniques can be configured to initiate each time a new data item is received, delay until a specified number of new data items are received (e.g., until a threshold number of items are received), or operate in response to some other trigger. However, once it is determined to begin the update, the basic planes are updated at 704. The updated basic planes cause updates to the clusters/orientation ranges at 706, because the updated basic planes can define new orientation values. With the updated clusters/orientation ranges, the identifications of dominant fracture orientations are updated at 708. With the updated identification of dominant fracture orientations, the histogram of the basic plane orientations can be updated at 710 and the identified fracture planes can be updated at 712.

In instances where the initial data is clustered with an adaptive technique, such as described in connection with FIG. 5 or FIG. 6, assimilating a new orientation value or values into the clusters can necessitate the clusters or a portion of the clusters to be redefined. For example, associating a new orientation value to an existing cluster may change the extent of variation of the orientation values in the cluster. In the iterative method, the change may render the cluster eligible to be merged with an adjacent cluster or split, which if performed, may in turn affect other nearby clusters rendering them eligible to be merged or split, which if performed, may in turn affect still other clusters, and so on in a ripple effect through the clusters. If more than one new orientation value is assimilated into the clusters, the effect is multiplied. The dynamic method can experience a similar ripple effect. Therefore, as new orientation values are assimilated into the clusters the clusters may be re-evaluated and existing orientation values re-associated with different clusters, clusters dissolved and/or new clusters formed.

If the process to assimilate a new orientation value or set of orientation values has initiated, and after a period of time, yet another new orientation value or set of orientation values is received, the assimilation of the first orientation value or set of values can be ceased. Thereafter, the process to re-evaluate and update the clusters is started over again, now taking into account the later received orientation values.

Some embodiments of subject matter and operations described in this specification can be implemented in digital electronic circuitry, or in computer software, firmware, or hardware, including the structures disclosed in this specification and their structural equivalents, or in combinations of one or more of them. Some embodiments of subject matter described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A client and server are generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). The relationship of client and server arises by virtue of computer programs running on the respective computers and having a client-server relationship to each other.

In some aspects of what is described here, dominant orientations embedded in sets of fractures associated with microseismic events can be dynamically identified during a fracture treatment. For example, fracture planes can be extracted from real time microseismic events collected from the field. The fracture planes can be identified based on microseismic event information including: event locations, event location measurement uncertainties, event moment magnitudes, event occurrence times, and others. At each point in time, data can be associated with previously-computed basic planes, including the microseismic supporting set of events.

In some aspects of what is described here, a probability histogram or distribution of basic planes can be constructed from the microseismic events collected, and the histogram or distribution can be used for deriving the dominant fracture orientations. Fractures extracted along the dominant orientations can, in some cases, provide an optimal match to the real time microseismic events. The histogram or distribution and the dominant orientations can have non-negligible sensitivity to the new incoming microseismic event. As such, some planes identified during the time microseismic data are assimilated may not be accurate when comparing to the post microseismic event data results.

In some aspects of what is described here, an accuracy confidence parameter can provide a measure for the accuracy of real-time identified planes. Factors impacting a plane's accuracy confidence can include an event's intrinsic properties, the relationship between support events and the plane, and the weight reflecting the fracture orientation trends of post microseismic event data. In some cases, fracture planes with high confidence at the end of hydraulic fracturing treatment that were identified in real time fashion are consistent with those obtained from the post event data.

In some aspects, some or all of the features described here can be combined or implemented separately in one or more software programs for real-time automated fracture mapping. The software can be implemented as a computer program product, an installed application, a client-server application, an Internet application, or any other suitable type of software. In some cases, a real-time automated fracture mapping program can dynamically show users spatial and temporal evolution of identified fracture planes in real-time as microseismic events gradually accumulate. The dynamics may include, for example, the generation of new fractures, the propagation and growth of existing fractures, or other dynamics. In some cases, a real-time automated fracture mapping program can provide users the ability to view the real-time identified fracture planes in multiple confidence levels. In some cases, users may observe spatial and temporal evolution of the high confidence level fractures, which may exhibit the dominant trends of overall microseismic event data. In some cases, a real-time automated fracture mapping program can evaluate fracture accuracy confidence, for example, to measure the certainty of identified fracture planes. The accuracy confidence values may, for example, help users better understand and analyze changes in a probability histogram or orientation distribution, which may continuously vary with the real-time accumulation of microseismic events. In some cases, a real-time automated fracture mapping program can provide results that are consistent with post data fracture mapping. For example, at the end of the hydraulic fracture treatment, the results produced by the real-time automated fracture mapping program can be statistically consistent with those obtained by a post data automated fracture mapping program operating on the same data. Such features may allow field engineers, operators and analysts, to dynamically visualize and monitor spatial and temporal evolution of hydraulic fractures, to analyze the fracture complexity and reservoir geometry, to evaluate the effectiveness of hydraulic fracturing treatment and to improve the well performance.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable subcombination.

A number of embodiments have been described. Nevertheless, it will be understood that various modifications can be made. Accordingly, other embodiments are within the scope of the following claims.

What is claimed is:

1. A computer-implemented method for analyzing microseismic data from a subterranean zone, the method comprising:
   receiving microseismic event data associated with a fracture treatment of a subterranean zone;
   identifying coplanar subsets of microseismic events in the received microseismic event data, each of the coplanar subsets comprising a non-collinear triplet of microseismic events in the received microseismic event data;
   determining a basic plane orientation for each of a plurality of basic planes defined by the coplanar subsets, each basic plane orientation being defined by the non-collinear triplet of microseismic events in a respective one of the coplanar subsets, each basic plane having an orientation relative to a common axis, updating, by data processing apparatus, clusters of orientations of the basic planes identified adaptively based on an extent of variation in the orientations;

identifying the number of orientations associated with each of the clusters;

displaying a histogram of the basic plane orientations, wherein the histogram indicates the number of orientations associated with each of the clusters; and identifying a dominant fracture orientation for the each of the clusters based on the number of orientations associated with the each of the clusters, the dominant fracture orientation representing an orientation of a physical fracture within the subterranean zone.

2. The method of claim 1, where the clusters of orientations were identified for a first set of microseismic data and updating is performed using the first set of data and a second, newly received, set of microseismic data.

3. The method of claim 2, where updating comprises:
associating an orientation of a basic plane defined by the second set of microseismic data to a cluster; and
re-associating an orientation of a basic plane defined by the first set of microseismic data with a different cluster than it had previously been associated with.

4. The method of claim 2, comprising:
ceasing updating the clusters of orientations upon receipt of a third set of microseismic data; and
updating the clusters of orientations based on the second and third sets of microseismic data.

5. The method of claim 2, where updating clusters of orientations comprises:
initially associating each of the orientations of the second microseismic data set with a cluster identified for the first microseismic data set;
merging adjacent clusters based on the extent of variation in the adjacent clusters;
re-associating the orientations of the merged clusters into new clusters, the new clusters each having an orientation range no greater than a different specified maximum range; and
repeating the merging and re-associating.

6. The method of claim 2, where updating clusters of orientations comprises:
merging the orientations of the first data set and the second data set; and
dynamically identifying clusters from the merged data set by associating each of the orientations with a cluster, the clusters each having a range of orientations no greater than a maximum range determined individually for each of the clusters based on the extent of variation in the cluster.

7. A non-transitory computer-readable medium encoded with instructions that, when executed by data processing apparatus, perform operations comprising:
receiving microseismic event data associated with a fracture treatment of a subterranean zone;
identifying coplanar subsets of microseismic events in the received microseismic event data, each of the coplanar subsets comprising a non-collinear triplet of microseismic events in the received microseismic event data;
determining a basic plane orientation for each of a plurality of basic planes defined by the coplanar subsets, each basic plane orientation being defined by the non-collinear triplet of microseismic events in a respective one of the coplanar subsets, each basic plane having an orientation relative to a common axis, updating clusters of orientations of the basic planes identified adaptively based on an extent of variation in the orientations;

identifying the number of orientations associated with each of the clusters;

displaying a histogram of the basic plane orientations, wherein the histogram indicates the number of orientations associated with each of the clusters; and identifying a dominant fracture orientation for the each of the clusters based on the number of orientations associated with the each of the clusters, the dominant fracture orientation representing an orientation of a physical fracture within the subterranean zone.

8. The computer-readable medium of claim 7, where the clusters of orientations were identified for a first set of microseismic data and updating is performed using the first set of data and a second, newly received, set of microseismic data.

9. The computer-readable medium of claim 8, where updating comprises:
associating an orientation of a basic plane defined by the second set of microseismic data to a cluster; and
re-associating an orientation of a basic plane defined by the first set of microseismic data with a different cluster than it had previously been associated with.

10. The computer-readable medium of claim 8, comprising:
ceasing updating the clusters of orientations upon receipt of a third set of microseismic data; and
updating the clusters of orientations based on the second and third sets of microseismic data.

11. The computer-readable medium of claim 8, where updating clusters of orientations comprises:
initially associating each of the orientations of the second microseismic data set with a cluster identified for the first microseismic data set;
merging adjacent clusters based on the extent of variation in the adjacent clusters;
re-associating the orientations of the merged clusters into new clusters, the new clusters each having an orientation range no greater than a different specified maximum range; and
repeating the merging and re-associating.

12. The computer-readable medium of claim 8, where updating clusters of orientations comprises:
merging the orientations of the first data set and the second data set; and
dynamically identifying clusters from the merged data set by associating each of the orientations with a cluster, the clusters each having a range of orientations no greater than a maximum range determined individually for each of the clusters based on the extent of variation in the cluster.

13. The computer-readable medium of claim 7, where updating clusters of orientations is done adaptively based on the extent of variation in the orientations.

14. A system comprising:
a non-transitory computer readable medium that stores microseismic event data collected from a subterranean zone and a plurality of basic planes, each defined from a subset of the microseismic data and each having an orientation relative to a common axis; and
a data processing apparatus operable to:
receive microseismic event data associated with a fracture treatment of a subterranean zone;

identify coplanar subsets of microseismic events in the received microseismic event data, each of the coplanar subsets comprising a non-collinear triplet of microseismic events in the received microseismic event data;

determine a basic plane orientation for each of a plurality of basic planes defined by the coplanar subsets, each basic plane orientation being defined by the non-collinear triplet of microseismic events in a respective one of the coplanar subsets, each basic plane having an orientation relative to a common axis;

update clusters of orientations of the basic planes identified adaptively based on an extent of variation in the orientations;

identify the number of orientations associated with each of the clusters;

display a histogram of the basic plane orientations, wherein the histogram indicates the number of orientations associated with each of the clusters; and identify a dominant fracture orientation for the each of the clusters based on the number of orientations associated with the each of the clusters, the dominant fracture orientation representing an orientation of a physical fracture within the subterranean zone.

15. The system of claim 14, where the clusters of orientations were identified for a first set of microseismic data and updating is performed using the first set of data and a second, newly received, set of microseismic data.

16. The system of claim 15, where updating comprises:
associating an orientation of a basic plane defined by the second set of microseismic data to a cluster; and
re-associating an orientation of a basic plane defined by the first set of microseismic data with a different cluster than it had previously been associated with.

17. The system of claim 15, comprising:
ceasing updating the clusters of orientations upon receipt of a third set of microseismic data; and
updating the clusters of orientations based on the second and third sets of microseismic data.

18. The system of claim 15, where updating clusters of orientations comprises:
initially associating each of the orientations of the second microseismic data set with a cluster identified for the first microseismic data set;
merging adjacent clusters based on the extent of variation in the adjacent clusters;
re-associating the orientations of the merged clusters into new clusters, the new clusters each having an orientation range no greater than a different specified maximum range; and
repeating the merging and re-associating.

19. The system of claim 15, where updating clusters of orientations comprises:
merging the orientations of the first data set and the second data set; and
dynamically identifying clusters from the merged data set by associating each of the orientations with a cluster, the clusters each having a range of orientations no greater than a maximum range determined individually for each of the clusters based on the extent of variation in the cluster.

20. The system of claim 14, where updating clusters of orientations is done adaptively based on the extent of variation in the orientations.

* * * * *